(12) United States Patent
Falzoni

(10) Patent No.: US 8,980,153 B2
(45) Date of Patent: Mar. 17, 2015

(54) MANUFACTURING METHOD

(75) Inventor: Alessandro Falzoni, Imola (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 296 days.

(21) Appl. No.: 13/125,142

(22) PCT Filed: Oct. 21, 2009

(86) PCT No.: PCT/IB2009/054639
§ 371 (c)(1),
(2), (4) Date: Jul. 11, 2011

(87) PCT Pub. No.: WO2010/046858
PCT Pub. Date: Apr. 29, 2010

(65) Prior Publication Data
US 2011/0260363 A1    Oct. 27, 2011

(30) Foreign Application Priority Data

Oct. 23, 2008  (IT) ............... MO2008A0270
Oct. 23, 2008  (IT) ............... MO2008A0271

(51) Int. Cl.
| | |
|---|---|
| B29C 45/14 | (2006.01) |
| B29C 57/00 | (2006.01) |
| B29C 45/00 | (2006.01) |
| B29C 53/84 | (2006.01) |
| B29C 53/02 | (2006.01) |
| B29L 31/56 | (2006.01) |

(52) U.S. Cl.
CPC ............. *B29C 57/00* (2013.01); *B29C 45/0055* (2013.01); *B29C 53/84* (2013.01); *B29C 53/02* (2013.01); *B29C 2045/0056* (2013.01); *B29L 2031/565* (2013.01)
USPC .......................................................... 264/265

(58) Field of Classification Search
USPC .................................................. 264/295, 265
See application file for complete search history.

(56) References Cited

U.S. PATENT DOCUMENTS

| | | | |
|---|---|---|---|
| 2,778,173 A | 1/1957 | Taunton | |
| 3,117,903 A | 1/1964 | Hix | |
| 4,343,754 A | 8/1982 | Wilde et al. | |
| 5,690,882 A | 11/1997 | Sprowl | |
| 5,786,079 A | 7/1998 | Alieri | |
| 2005/0051928 A1 | 3/2005 | Gruau et al. | |
| 2008/0054524 A1* | 3/2008 | Chisholm et al. | 264/320 |

FOREIGN PATENT DOCUMENTS

| | | | |
|---|---|---|---|
| EP | 1108523 A1 | 6/2001 | |
| EP | 1165391 | 1/2002 | |
| EP | 1588673 A2 | 10/2004 | |

* cited by examiner

*Primary Examiner* — Larry Thrower
(74) *Attorney, Agent, or Firm* — Laubscher, Spendlove & Laubscher, P.C.

(57) ABSTRACT

A method for making products made of plastics comprises the steps of molding a piece made of polyethylene PE, or made of polypropylene PP, and mechanically folding in a guided manner a flap portion of the aforesaid piece at a folding temperature that is greater than ambient temperature ed less than the alpha-type intermediate physical transition temperature of the material. The method reduces the spring-back of the folded portion and the yield in the folding zone.

15 Claims, 21 Drawing Sheets

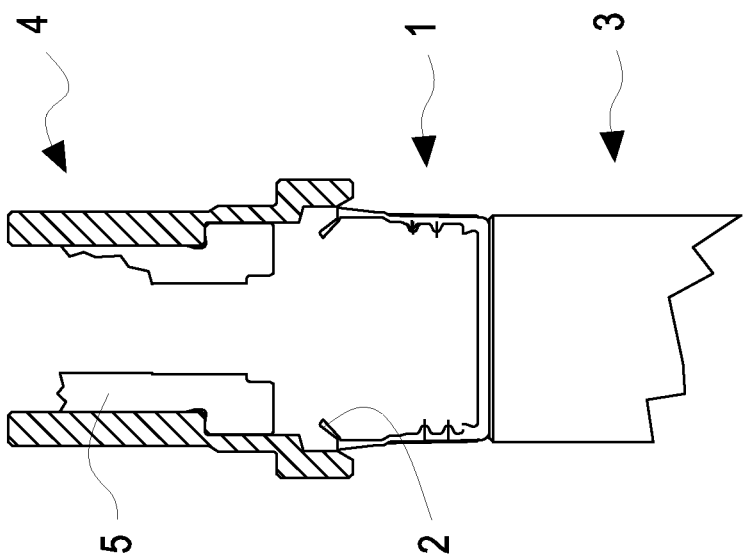
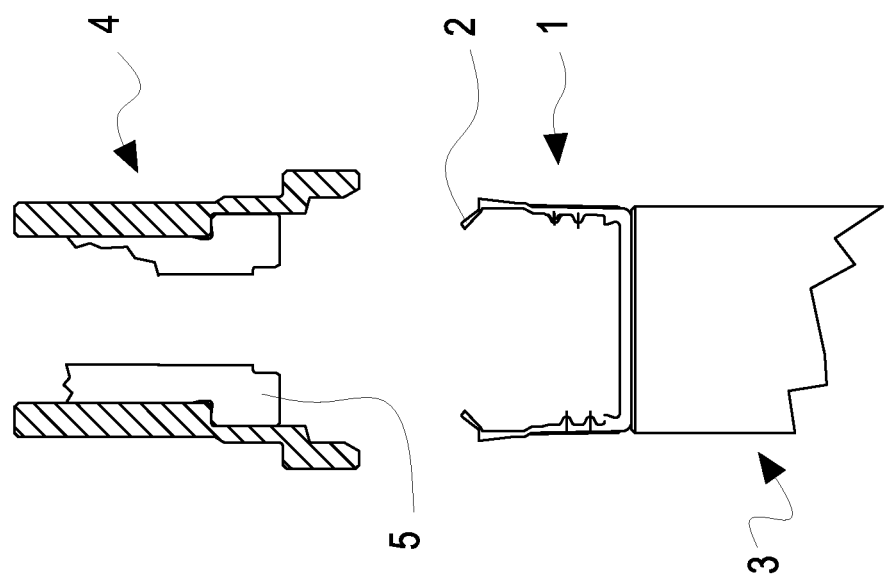
Fig. 1B
Fig. 1A

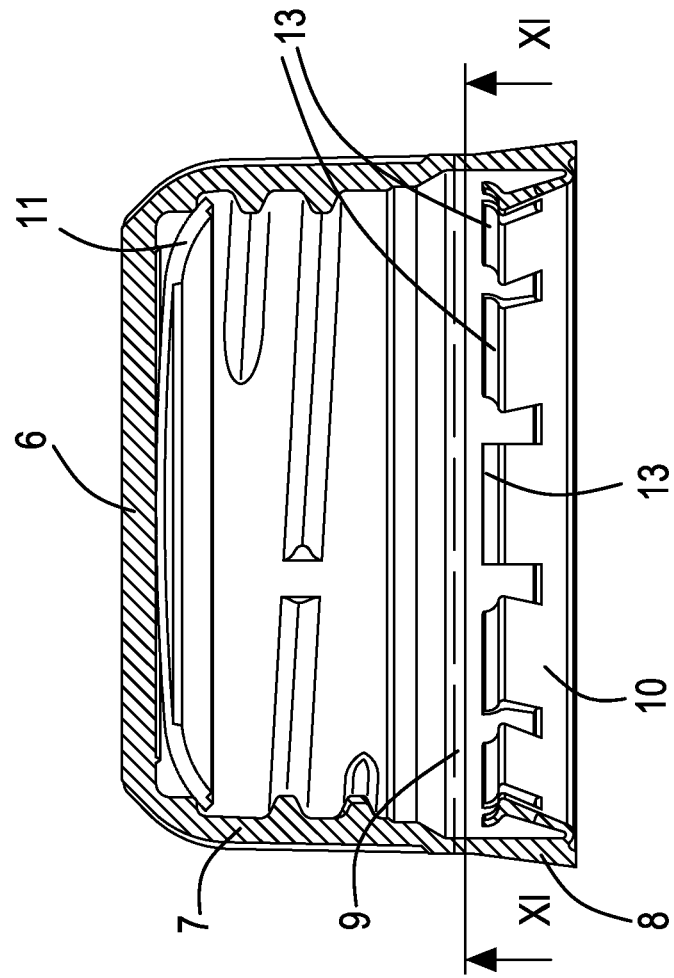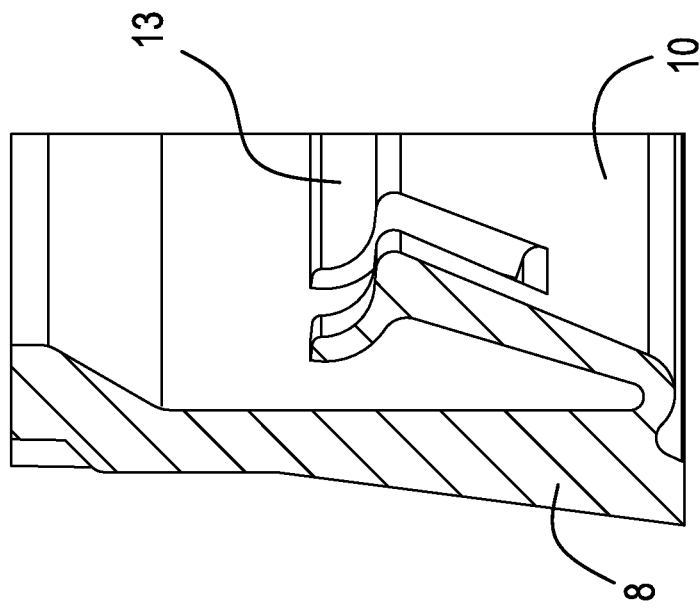
Fig. 12
Fig. 13

MANUFACTURING METHOD

This application is a continuation of PCT International Application No. PCT/IB2009/054639 filed Oct. 21, 2009. PCT/IB2009/054639 claims priority of IT Application No. MO2008A000270 filed Oct. 23, 2008 and IT Application No. MO2008A000271 filed Oct. 23, 2008. The entire contents of these applications are incorporated herein by reference.

BACKGROUND OF THE INVENTION

The invention relates to a method for manufacturing products made of plastics.

Specifically, but not exclusively, the method can be used for making caps for containers provided with a tamperproof band having a flap portion folded inwards, this flap portion being in particular configured for forming an abutting element that cooperates with the neck of the container in order to detach the tamperproof band when the container is first opened.

A method is known for folding an annular flange of a tamperproof band of a cap made of plastics according to which the cap, when it has just been extracted from the mould, has the flange orientated with a tilt that is different from the tilt thereof when in use; the cap is then cooled to ambient temperature, after which the flange is folded mechanically to the use configuration.

From EP 1165391 a method is known for making a cap made of plastics provided with a flexible band that is moulded in the use configuration (folded towards the inside of the cap), and in which the spring-back of the band to the original forming position thereof is forced mechanically immediately after moulding of the cap, by an element of the forming mould or by another element that acts after extraction of the cap from the mould, before cooling of the band.

From U.S. Pat. No. 5,846,471 a method is known for moulding a closure with a safety band provided with flaps extending radially inward and upwards, in which the flaps are first moulded with the desired tilt, then the mould is opened by temporarily altering the angle of tilt of the flaps, lastly the flaps return to the original tilt through the effect of the contact with a part of the mould.

Various aspects of the prior art methods are improvable. First, it would be desirable to be able to decrease the effect of the spring-back of the material after the element made of plastics has been folded, so as to reach easily and reliably a final configuration that is as close as possible to that desired, this drawback being detectable in particular when folding is performed hot. Second, it would be desirable to minimise the yield effect of the material near the folding zone, so that the connection between the folded element and the rest of the workpiece is not weakened, this drawback being detectable particularly when folding is performed cold.

Specifically, but not exclusively, the method can further be used to make caps for containers provided with a skirt portion and with a tamperproof band intended for being separated from the skirt portion when the container is first opened (in order to provide clear proof of opening) through the effect of the breakage of a facilitated breaking zone. The tamperproof band is generally provided with a contrasting arrangement that may comprise, by way of non-limiting example, an inwardly folded flap portion. In particular this contrasting arrangement can be configured to form one or more abutting elements that cooperate with at least one protrusion on the neck of the container in order to detach the tamperproof band when the container is first opened.

Forming the aforesaid facilitated breaking zone by using cutting devices that operate so as to perform a cut (continuous or discrete) along a circumferential zone of the skirt portion is known. Some examples of cutting devices of known type used for this purpose are shown in the patent documents EP 0619168, WO 99/17911, WO 00/44538, WO 2004/004993.

One of the problems of known forming systems of the facilitated detachment zone of a cap made of plastics with tamperproof band consists of the fact of ensuring a clean and precise cut in the plastic material, such as to avoid the risk of anticipated and undesired detachment of the tamperproof band, and simultaneously to ensure that when the container is first opened the band is detached correctly with facility and cleanly. It is therefore necessary or at least advantageous to make the cut within precise tolerances. Another problem is that of performing the cut rapidly in order to increase productivity.

A further problem is that of choosing suitable conditions for cutting in function of the type of product to be cut, in particular according to the type of plastic material and of the form of product.

Another problem arises if the cutting of the material for forming the tamperproof band coincides with (generally immediately before or after) the guided mechanical folding of the possible flap portion, this folding generally being conducted after moulding to bring this flap portion (when present) to the use configuration in which it faces inwardly the cap and upwards (with reference to the use configuration in which the cap closes the upper mouth of the container that is arranged standing). This folding is generally necessary because in the use configuration the flap portion forms an undercut that would not allow removal from the mould. If the folding step is conducted near the place or time with the step of cutting the tamperproof band, there is thus the problem of finding a work condition that is suitable for correctly performing both operations.

SUMMARY OF THE INVENTION

An object of the invention is to improve the prior art in one or more of the aforesaid aspects.

Another object is to provide a method for manufacturing bodies made of plastics, in particular caps, that is simple, easy and cheap to implement.

A further object is to provide a method for manufacturing products made of plastics provided with a part that is folded after moulding, in which reaching the desired configuration of this folded part in a precise and reliable way is facilitated.

Still another object is to make available a product made of plastics and a method for manufacturing such a product, in which a folded element is connected firmly and strongly to the rest of the body of the product.

An advantage of the invention is to give rise to a manufacturing method of a product made of plastics that is implementable with known manufacturing systems or with few and simple modifications to such systems.

Another advantage is to provide a suitable method for manufacturing caps made of plastics, each comprising a tamperproof band having an annular side wall and an annular flange, in which this flange is folded inwards and is configured for expanding radially during the application of the cap to the mouth of a container, thus facilitating the passage of the tamperproof band, to then yield to the original position at the end of the application, forming an abutting element that is able to cooperate, at the first opening of the container, with a corresponding abutting element associated with the container to cause the detachment of the tamperproof band.

In a second aspect, a further object is to provide a method for manufacturing products made of plastics provided with a facilitated detachment zone, in which this zone is makable in a precise and reliable manner.

Still another object is to make available a product made of plastics, and a method for manufacturing the object, in which an element that is detachable from the rest of the product body is connected along a facilitated detachment zone constructed in a precise manner.

An advantage of the invention is to give rise to a manufacturing method of a product made of plastics that is implementable with known manufacturing systems or with few and simple modifications to such systems.

Another advantage consists of a versatile method that is able to perform a material removal step effectively in a product made of plastics, in particular a precise and reliable cut in a cap made of plastics, also for different types of product, for example by varying the type of material and the form of the product.

A further advantage is to provide method that is suitable for manufacturing caps made of plastics, each cap comprising a tamperproof band that is detachable when the container is first opened.

Such objects and also others are all reached by the method according to one or more of the claims set out below.

The element that is folded after moulding may comprise, as already said, the flexible flange with which a tamperproof band of a cap made of plastics is normally provided. This foldable flange may have any of the geometries of known foldable flanges: this flange may comprise, for example, an only smooth and continuous annular strip, or an only annular strip provided with one or more interruptions such as through holes and/or non-through openings, or an element that extends annularly and is wholly or partially corrugated, or a series of elements (flaps) that are connected to the side wall of the tamperproof band and are spaced apart from one another, or a series of elements that are arranged annularly and are interconnected one another, and any other known type of foldable flange of a tamperproof band.

The element that is folded after moulding can have been moulded in the same configuration (for example with the same tilt) that this element should assume after subsequent folding, or can have been moulded in a different configuration (tilt), such as, for example, a suitable configuration for facilitating the extraction of the element from the forming cavity. In the specific case of the production of caps with a tamperproof band it is possible to provide for the foldable flange of the tamperproof band being moulded in the use configuration, i.e. pointing towards the upper wall of the cap (where "upper" is defined with reference to the configuration in which the cap closes the upper mouth of a container arranged in a standing position), or in a different configuration in which, for example, the foldable flange of the tamperproof band faces an opposite side to the upper wall of the cap. It is known that it is generally necessary a folding operation after moulding because in order to enable the cap to be extracted from the forming cavity the flange will in general have to be folded on the opposite side to the upper wall of the cap.

The folding operation can be performed with a mechanical guiding device, in particular with a mechanical guiding device of known type. This guiding device can be configured for operating in the mold or also in a position outside the mold.

The moulding operation can be performed by injection-moulding or by compression-moulding or by any other plastic material forming process. The moulding device can be configured for operating continuously or intermittently.

The cooling operation can be performed by using a cooling active arrangement, such as, for example, a cooling tunnel, a cooling fluid conveyor, a conveyor belt provided with a cooling device, etc.

The cooling operation can be performed by using a passive cooling arrangement, such as, for example, a path arranged between the molding zone and the folding zone and configured in such a manner that each molded piece is conducted along the path and thus reaches the folding zone having the desired temperature. This path may also include a waiting and storage step (with controlled temperature and/or waiting time) of the molded product. This path may have a preset and known temperature (for example, ambient temperature). This path can be configured so that a given molded product can travel the path from the molding zone to the folding zone in a pre-established time or a time preset as a function of the type of product and/or of the desired folding temperature and/or the temperature of the path.

It is possible to use the manufacturing method disclosed here not only for caps made of plastic but also for other types of product (in particular for moulded products made of plastics having a part folded after extraction from the forming cavity), or also for elements that are generally folded in a force and/or guided manner after moulding and have no annular shape and/or are not connected to the rest of the body of the moulded piece along a connecting or folding zone of annular shape.

According to an embodiment of the invention, a product manufacturing method comprises the steps of moulding a piece made of plastic material having at least a skirt portion, forming by removing material on the skirt portion a facilitated detachment zone that separates an edge portion from the rest of the skirt portion, and selecting the temperature of the plastic material of the skirt portion at which this removal of material is conducted in function of an intermediate physical transition temperature of the plastic material.

The aforesaid intermediate physical transition temperature could comprise, for example, the alpha-type physical transition temperature of the plastic material.

The material removal step, a step that forms a facilitated detachment zone that separates an edge portion from a skirt portion, can be performed simultaneously, for example before or after or during a guided folding step of a protruding part that protrudes from the aforesaid edge portion.

SHORT DESCRIPTION OF THE DRAWINGS

The invention can be better understood and implemented with reference to the attached drawings that illustrate some embodiments thereof by way of non-limiting example.

FIGS. 1A to 1E show in succession five steps of the folding operation of a flexible annular flange associated with an annular safety band of a cap made of plastics.

FIG. 12 is a section according to the line XII-XII of FIG. 11.

FIG. 13 is an enlarged detail of FIG. 12.

Figure 20A:
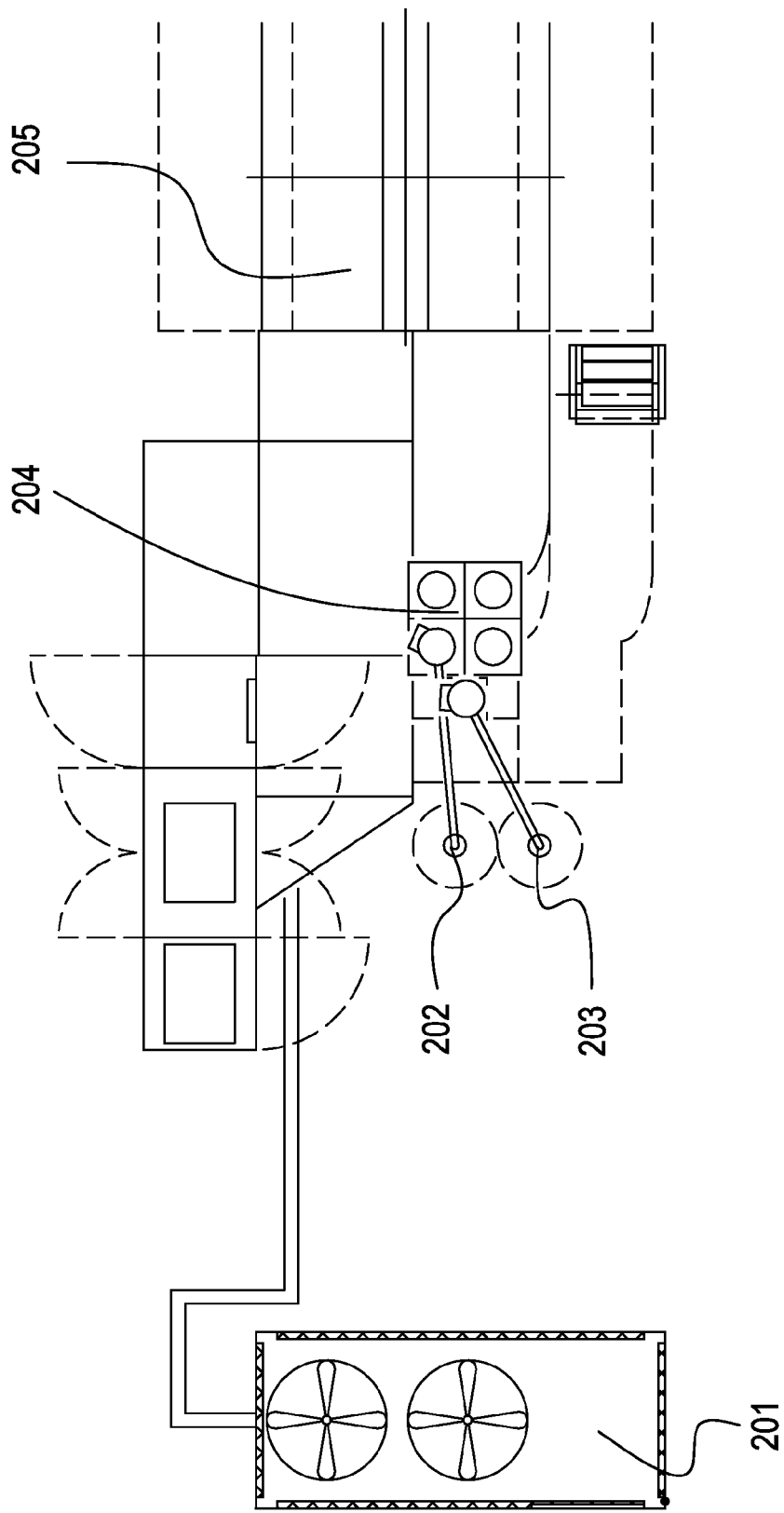

FIGS. 20A e 20B are two parts of a top plan view of a second embodiment of a plant for manufacturing caps made of plastics having a safety band provided with a flexible flange to be folded inwards.

Figure 21:
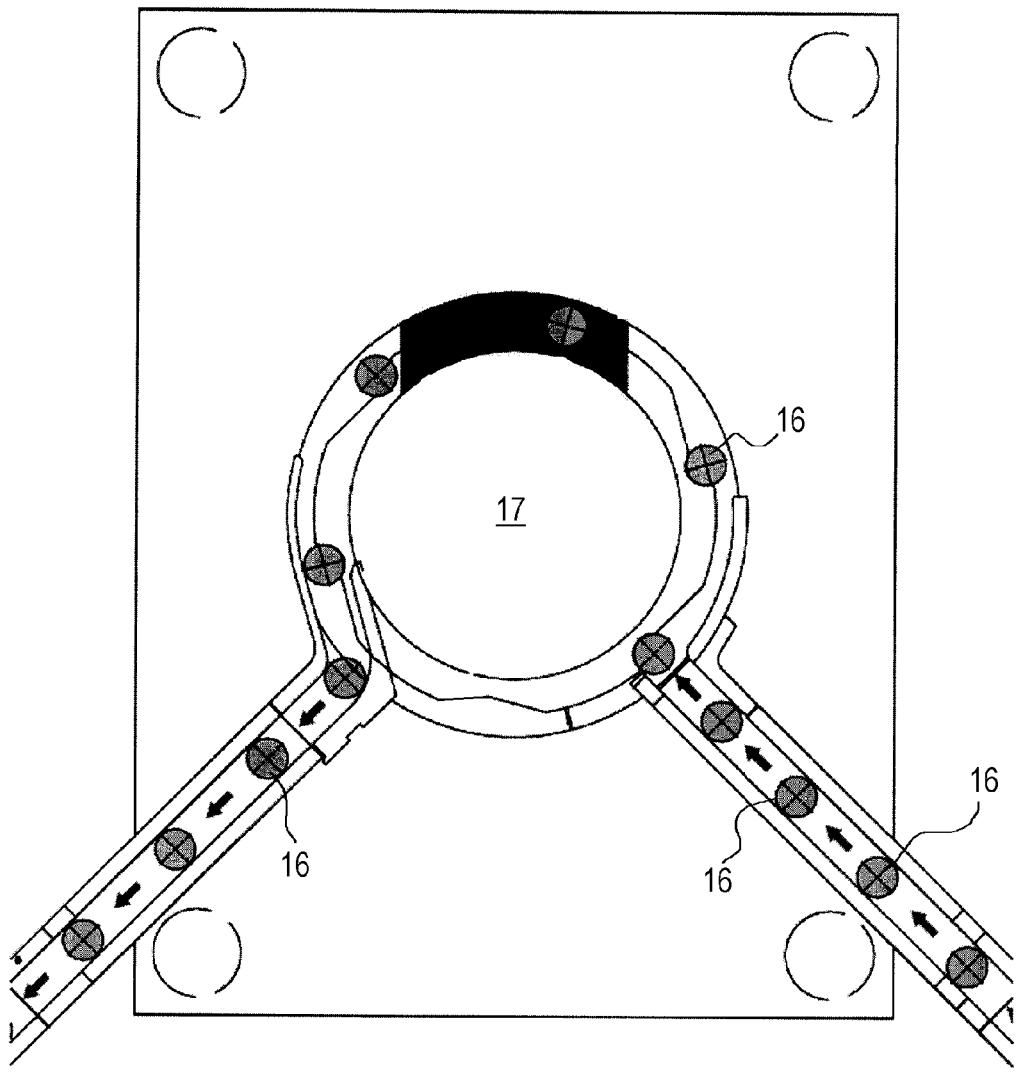

FIG. 21 shows a diagram of a folding device that is usable in the method in subject for folding the flap portion of the tamperproof bands of the caps made of plastics.

Figure 22:
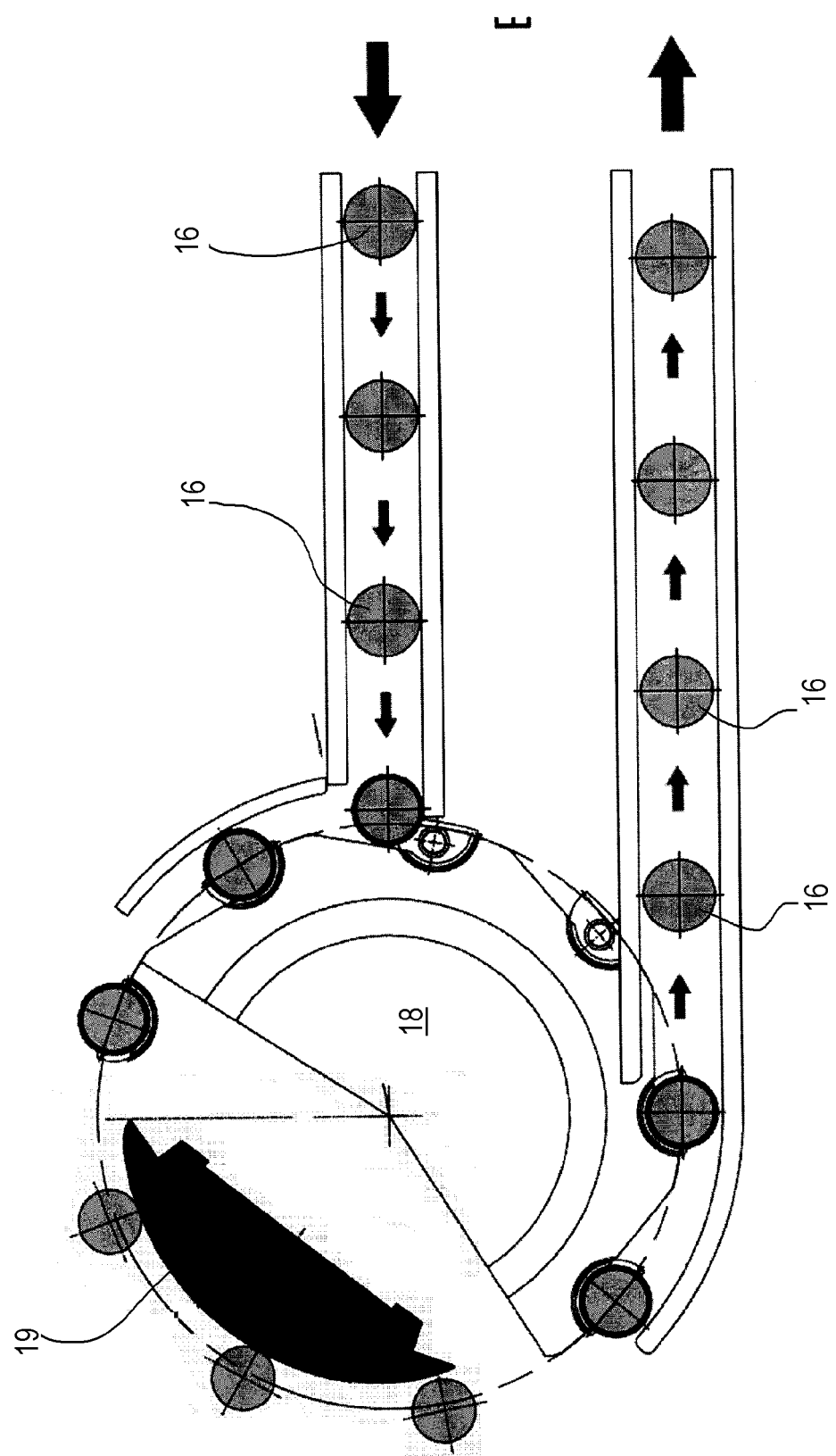

FIG. 22 shows a diagram of a cutting device that is usable in the method in subject for forming the facilitated detachment zone of the tamperproof bands of the caps made of plastics.

Figure 23:
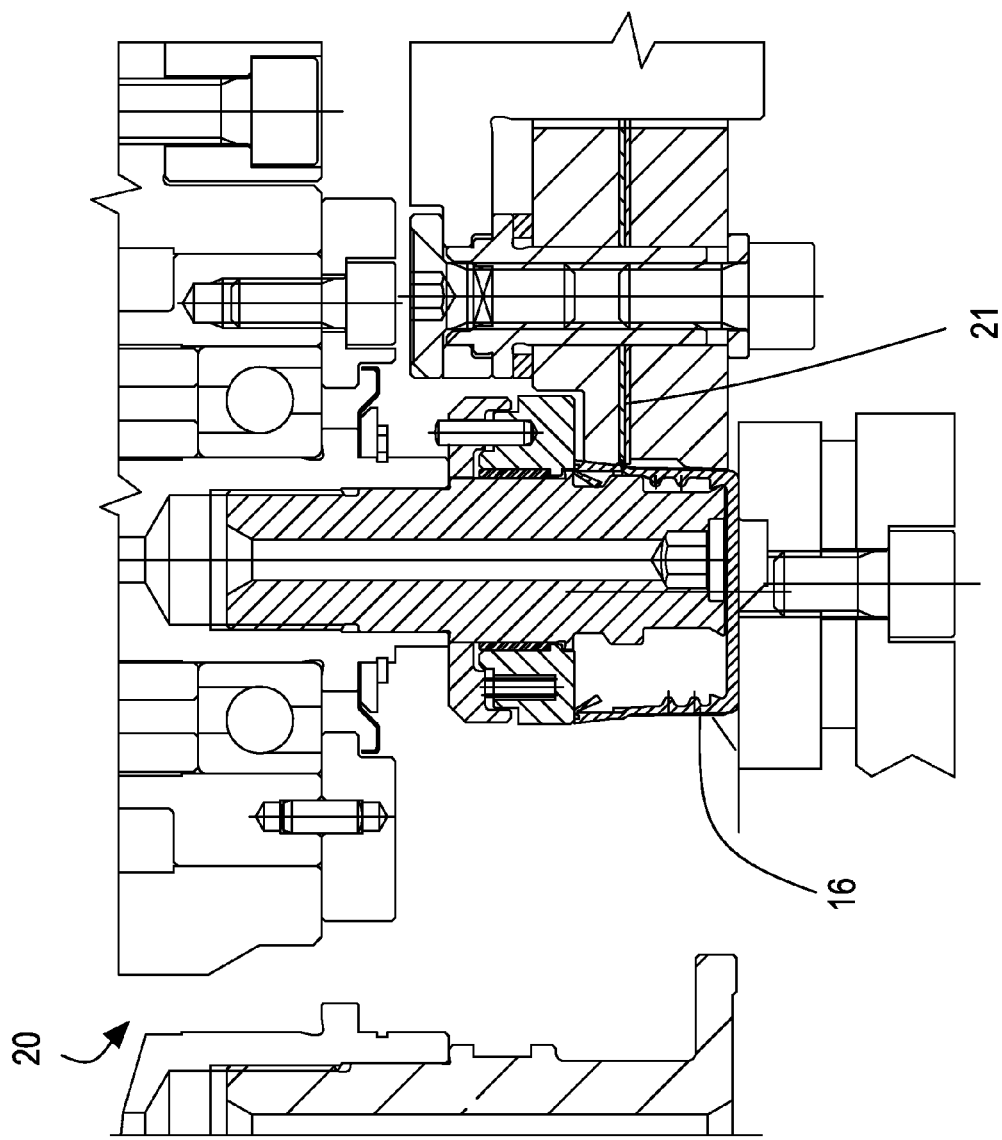

FIG. 23 shows a section of a cutting tool that is usable in the method in subject for forming the facilitated detachment zone of the tamperproof bands.

DETAILED DESCRIPTION

A method is now disclosed for manufacturing products made of plastics, in particular for manufacturing caps for containers, such as, for example, a method for manufacturing any of the caps illustrated in FIGS. 5 to 18.

The method includes the step of molding a piece made of a synthetic plastic material, for example a semi-crystalline plastic material, in which the molded piece can have at least a skirt portion and an edge portion (for example of annular shape) connected to the skirt portion along a connecting zone that may be, for example, of annular shape (closed or open) or arranged along a region with a circumferential extent, and which may be continuous or discontinuous (for example dashed). As is known, a cap made of synthetic plastics is normally provided with this skirt portion that generally (when the cap is coupled with a neck of a container for closing the top mouth thereof) surrounds at least part of the neck. This skirt portion can be provided with a thread for screwing to the neck of the container. It is possible to manufacture other types of caps provided with other arrangements (of known type) of coupling with the container (alternatively or additionally to a screw coupling arrangement). This molding step may include an operation performed with a molding arrangement and with operating methods that are substantially of known type. This molding may include one or more injection-molding operations (performed with arrangements and methods of known type), or one or more compression-molding operations (also performed with arrangements and methods of known type) or other operations (conducted with arrangements and methods of known type) for heat-forming a product made of synthetic plastic material.

During this moulding step a product part is also moulded (generally a part protruding or emerging from a main body) that is then intended for folding. This part intended for folding can be, as in the specific case, the aforesaid edge portion connected to the skirt portion. This part intended for folding can be a part that in the final product will form an undercut and can thus in general not be extracted from the forming cavity remaining in the desired final configuration (i.e. in the undercut configuration). In such cases a subsequent folding operation is conducted after moulding. It is possible that the manufacturing method in subject provides that the piece is moulded in such a manner that this undercut part (flap) already assumes in the forming cavity the final use configuration (i.e. the undercut configuration): in this case this undercut part will thus be deformed during the step of extracting the moulded piece from the forming cavity in the direction of the extraction that causes the undercut moulded part (flap) to overturn outwards. In order to facilitate and/or guide the return of this undercut part to the use configuration (corresponding, exactly or approximately, to the moulding configuration in the forming cavity) folding is conducted.

It is also possible for the manufacturing method in subject to mould the piece so that the part intended to be undercut is formed with a configuration different from the use configuration, in particular it is possible for this part to be moulded in a configuration that is already able to enable/facilitate extracting from the forming cavity. In the specific case of the production of caps made of plastics, it is thus possible for the portion to be folded (which in practice is the flap part of the tamperproof band of the cap that is intended to form, in use, the abutting element that abuts on the collar of the neck of the bottle) is already formed during the moulding step in the use configuration—i.e. folded inwards and upwards (with reference to the usual configuration in which the cap is applied to the neck of a standing container) i.e. to the closing portion or top portion of the cap, which portion is generally disc-shaped—or in a configuration other than the use configuration, for example an axial configuration (not tilted with respect to the axis of the cap) or with a slight tilt inwards but oriented on a side opposite the closing portion of the cap (in practice an orientation of the type of the flap 2 illustrated in FIG. 1A).

The manufacturing method, after moulding the product and opening the forming cavity, provides to mechanically folds in a guided manner the aforesaid annular portion around the connecting zone (or folding zone) at a preset folding temperature (as will be explained better below) that is greater than ambient temperature.

This folding may occur before the hot product that has just be subjected to the hot moulding operation is completely cooled, or after complete cooling of the moulded product and subsequent second heating thereof at a preset temperature that is greater than ambient temperature, this second heating being able to be conducted immediately after cooling or at a great distance of time and/or of space from cooling.

Figure 1E:
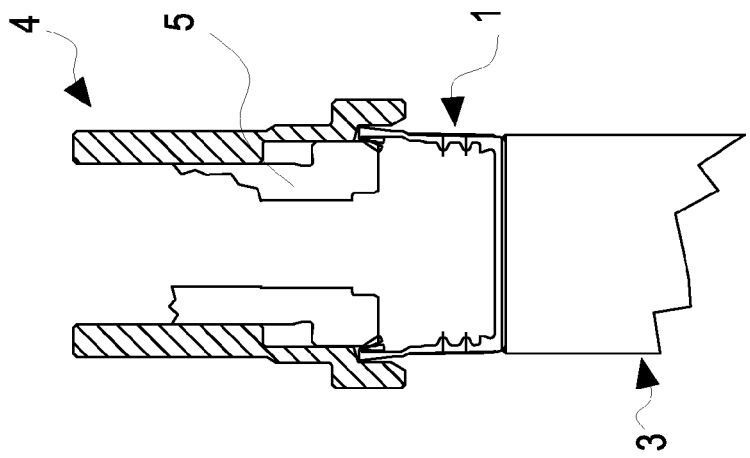
Figure 1D:
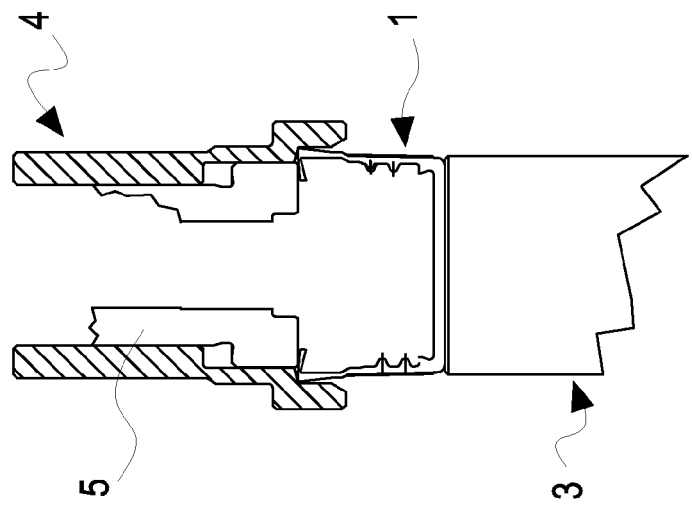
Figure 1C:
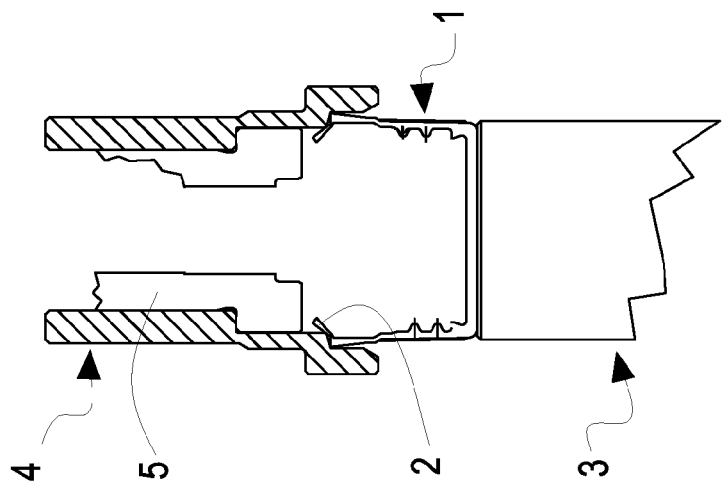

With reference to FIGS. 1A to 1E, 1 indicates the moulded piece, 2 the annular portion that has to be folded, 3 a support (of known type) for the moulded piece, 4 a folding tool (of known type). The folding operation may comprise, as in this case, a reciprocating (axial) movement of the lower support 3 and of the folding tool 4 (FIGS. 1A to 1C) to move the moulded piece towards the cutting tool 4, and then a movement of a movable portion 5 of the tool that acts mechanically in contact with the portion 2 to be folded (FIGS. 1D and 1E).

The manufacturing method comprises the step of selecting the aforesaid preset folding temperature (i.e. the temperature of the material of the moulded product or, more in particular, of the portion of this product to be folded, during the folding operation) in function of the alpha-type physical transition temperature $T\alpha$ of the plastic material from which the product for moulding has been obtained.

For example, the folding temperature can be selected so as to be less than the aforesaid alpha-type physical transition temperature $T\alpha$. Further, the aforesaid folding temperature can be greater than the beta-type physical transition temperature $T\beta$ of the plastic material. The aforesaid $T\alpha$ and $T\beta$ transition temperatures, that can vary in function of the material and of other parameters, are temperatures that are known in the technology of plastic material. A short explanation of these transition temperatures $T\alpha$ and $T\beta$ of the materials is provided below.

It is known that polymeric semi-crystalline plastic material (for example PE, PP, PA, POM, PET, etc) are distinguished by having some parts in an amorphous phase (in which the polymeric chains are disordered, giving rise to more flexible zones) and other parts in a crystalline phase (in which the polymeric chains are ordered, giving rise to stiffer zones). It is also known that the semi-crystalline polymers have, in addition to a melting temperature Tm in which the transition between the solid and the liquid phase occurs, also a glass transition temperature Tg in which the amorphous portion passes from a stiff solid phase to a plastic solid (rubbery) phase, whilst for the amorphous polymers the glass transition temperature Tg indicates the transition between a stiff solid phase (glass and fragile) and a rubbery solid phase that, as the temperature increases, is then transformed into a viscous liquid phase.

Figure 2:
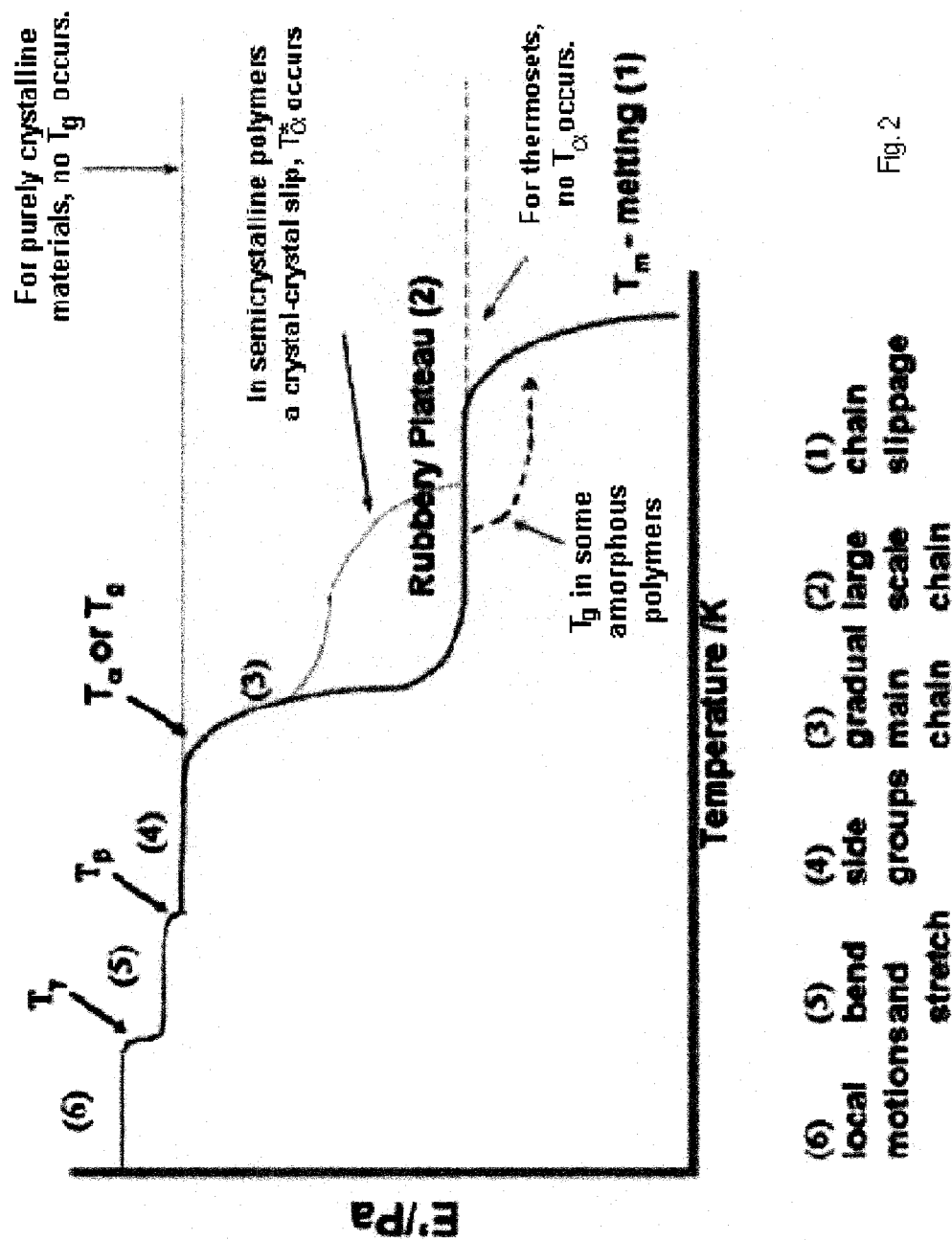
FIG. 2 is a diagram that indicates in a qualitative manner the variations of the storage modulus E' the materials, in particular polymeric materials, as the temperature varies in order to highlight the transition temperature in the materials.

Above the glass transition temperature Tg reciprocating movements between segments of a polymeric chain become possible. At temperatures below the glass transition temperature Tg movements can still occur in the mass of the polymer, in general limited to small groups of atoms. These movements are characterised by transition temperatures (so-called secondary transition temperatures) generally indicated by $T\beta$, $T\gamma$, $T\delta$. In certain cases, below the temperature Tg, whilst the movements of relatively long polymeric chain segments (i.e. containing a certain number of monomeric units) are blocked, certain secondary movements are still possible, for example the movements of shorter chain segments or of small groups of atoms contained in the single monomeric units; the movements of other groups of atoms can then be blocked only below the temperature $T\beta$, whereas other movements of the same groups of atoms and/or certain movements of other groups of atoms can be blocked only below the temperatures $T\gamma$ or $T\delta$. FIG. 2 shows how these secondary transitions are detectable by a diagram of the elastic dynamic modulus or storage modulus E' in function of the temperature, obtained by dynamic-mechanical analysis (DMA). In particular it has been found, always by dynamic-mechanical analysis techniques, that isotactic polypropylene (i-PP) shows three transition steps $\gamma$-, $\beta$- and $\alpha$- in the −150 to 150° C. temperature range, and that the polyethylene (PE) below the melting point Tm shows three transition points in which the transition $\gamma$ occurs in a range comprised between −150 and −100° C. whilst the transition a generally occurs between 30 and 100° C., in function of the type of PE. It is generally considered that for semi-crystalline polymers the transition $\alpha$ represents the crystalline phase and in fact originates from some movements inside the crystals.

Figure 3A:
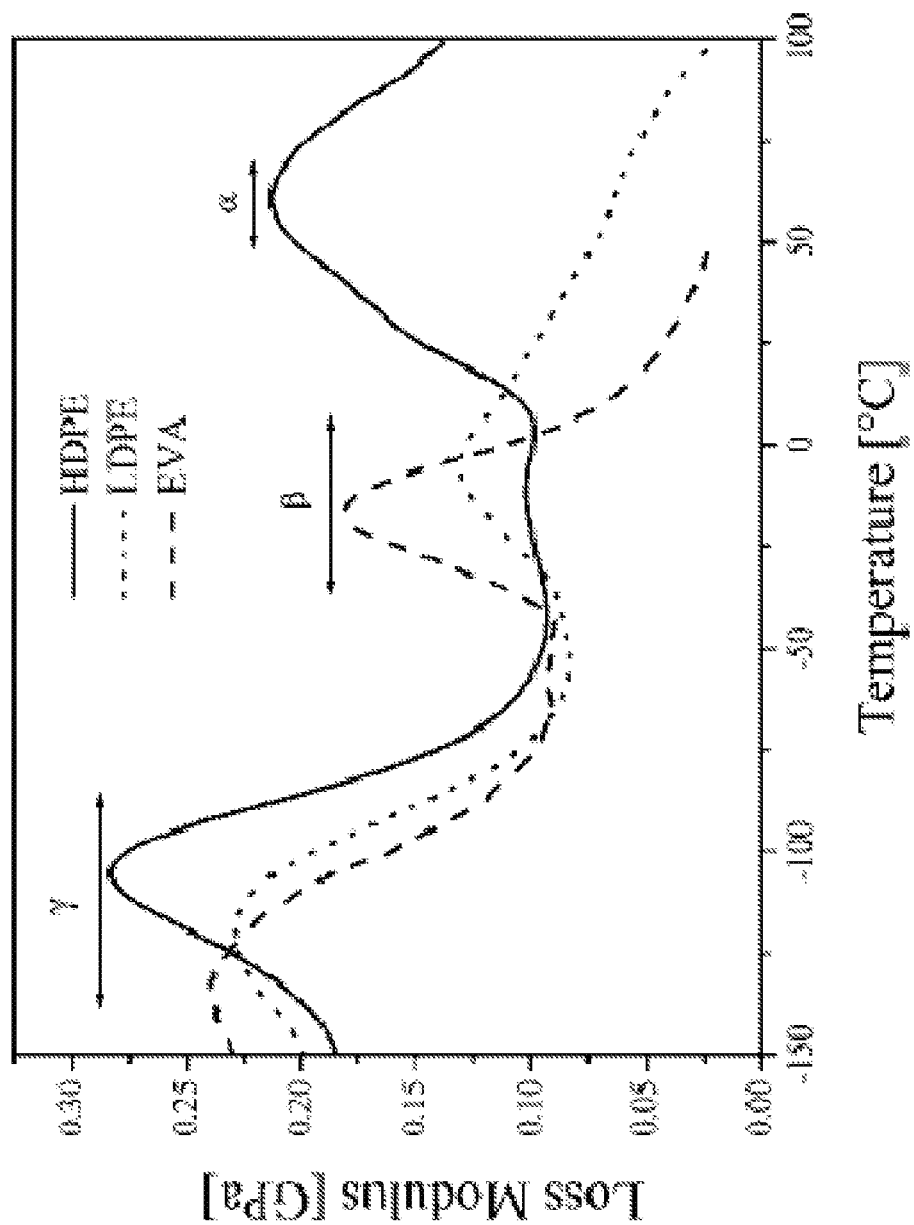
FIG. 3A is the diagram of the variations of the dissipation modulus in function of the temperature for three different types of plastic material (HDPE, LDPE, EVA).
Figure 3B:
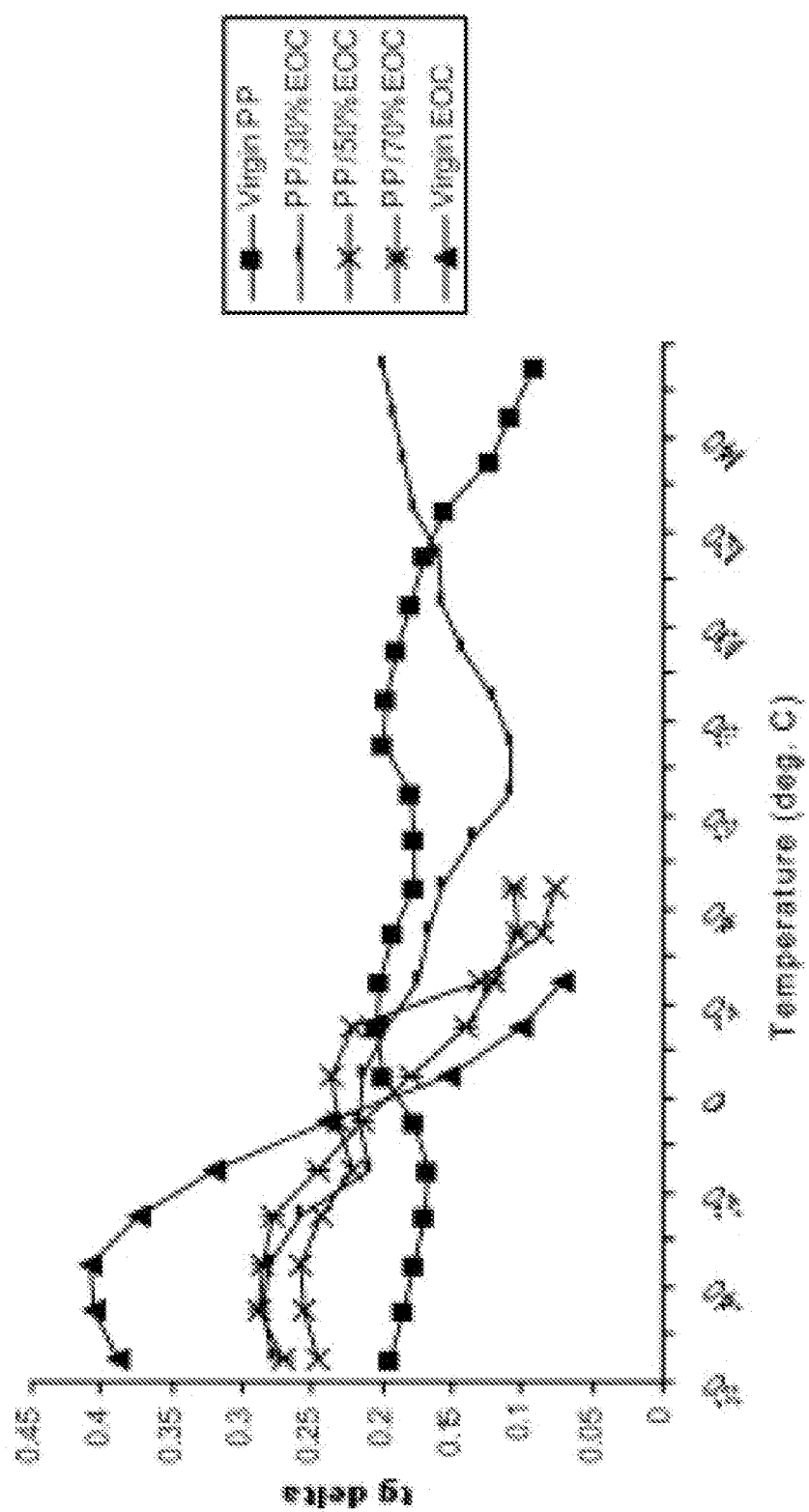
FIG. 3B is the diagram of the variations of Tan_delta (E'/E" ratio), i.e. of a parameter that is indicative of the dissipation of energy of a material and which is often called damping, for five different materials obtained with different percentages of PP (polypropylene) and EOC (ethylene-octene copolymer).
Figure 4:
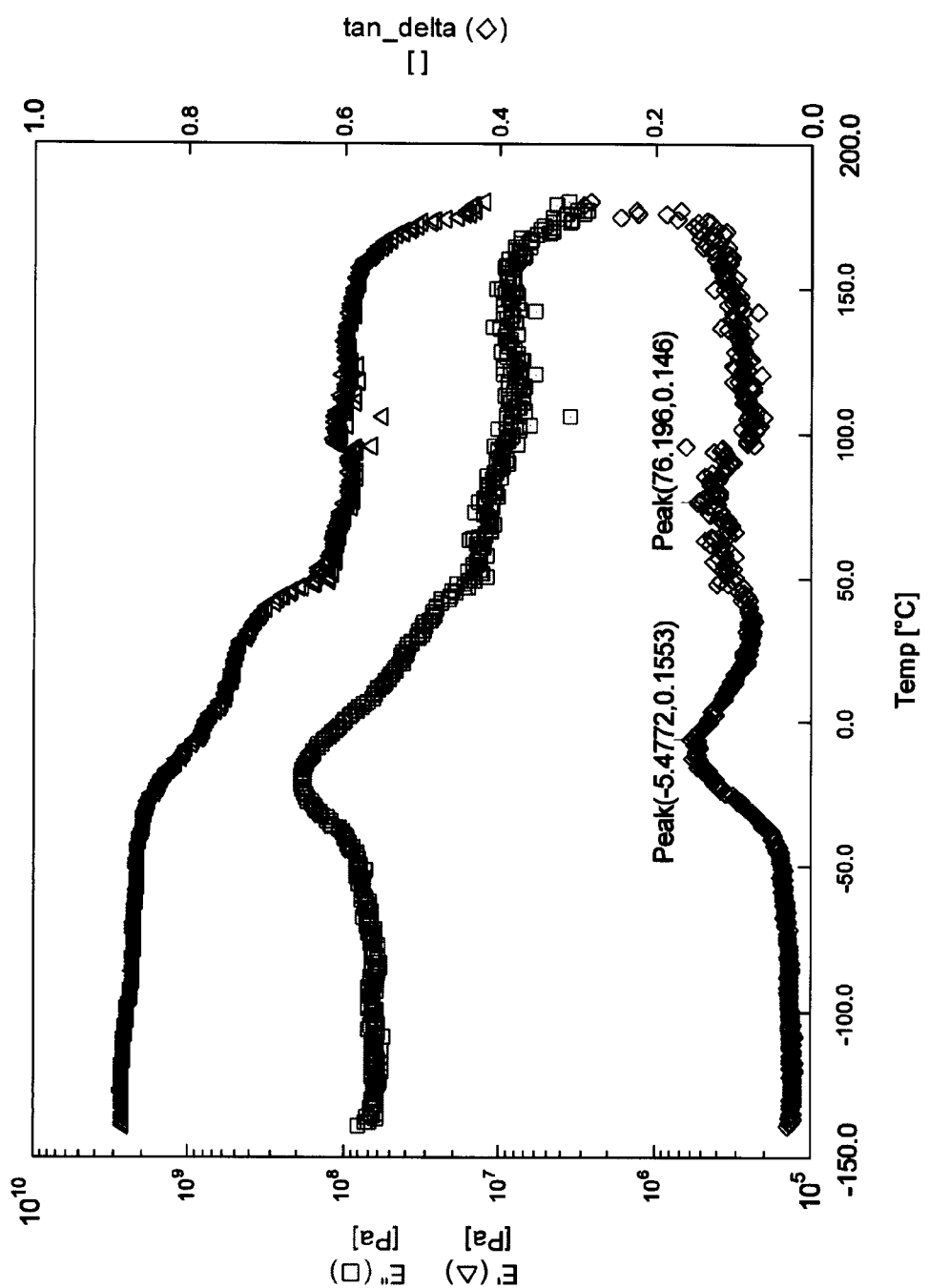
FIG. 4 is a diagram of the storage modulus E', of the dissipation modulus E" and of the damping parameter Tan_delta, as the temperature varies for a sample taken from a polypropylene cap.

In FIG. 3A the graph of the movement of the viscous dynamic modulus or Loss modulus in function of the temperature is shown for the three plastic material HDPE, LDPE and EVA, as reported in the technical literature. In FIG. 3B the graph of the trend of the damping parameter Tan_delta (i.e. of the phase delay tangent $\delta$ between tension and deformation in the material, or of the ratio between the Loss modulus and the storage modulus, also called damping) is shown in function of the temperature, for various mixtures of PP and EOC, as reported in the technical literature. In FIG. 4 the graph of the trend is shown, in function of the temperature, of the viscous dynamic modulus or Loss modulus E", of the elastic dynamic modulus or storage modulus E', and of the damping parameter tg_delta of a sample of material taken from a polypropylene PP cap.

The applicant has found that the folding (and/or the cut) of a part of a piece obtained by moulding plastic material (for example the folding of a flap portion of a safety band of a cap made of plastics), if performed at a temperature that is approximately the same or less than the transition temperature $T\alpha$ of the material (temperature below which movements inside the crystallites cannot occur) and above the transition temperature $T\beta$ (glass transition temperature), or also above the ambient temperature Tamb if Tamb>$T\beta$, is better than a folding (and/or cutting) of the same part (flap portion) conducted at a temperature that is greater than the transition temperature $T\alpha$ (for example by conducting folding immediately after hot moulding of the cap with band, by a tool inside the mould or as soon as the cap is extracted from the mould), or better than a folding (and/or cutting) of this part (flap portion) made after cooling of the moulded piece (cap with tamperproof band provided with flap portion) at ambient temperature.

In particular it has been found that if the flap portion of the safety band is folded at a temperature that is approximately the same or less than the transition temperature $T\alpha$, the spring-back of the flap portion after the folding operation is reduced. This reduction in the spring-back could be due to the fact that at the transition temperature $T\alpha$ or at temperatures slightly less than $T\alpha$, some parts or zones or components of the semi-crystalline plastic material that form the cap (for example the crystallites contained in the mass of material) have lost, at least partially, their mobility. It has also been found by the applicant that folding at the aforesaid temperature (greater than the ambient temperature and about the same or slightly less than the temperature $T\alpha$) does not produce on the folded part, in particular along the folding zone, significant yielding phenomena or other types of weakening.

In greater detail, it has been found that in a cap made of plastics, for example like one of those disclosed with reference to FIGS. 5 to 18, in which the flap can be folded by known system, for example with the folding system disclosed with reference to FIGS. 1A to 1E, this folding (and/or cutting of the facilitated detachment zone) is performed with particular efficacy at the following temperatures: for a cap made of high density polyethylene HDPE in a temperature range comprised between 15 and 60° C., for a cap made of polypropylene PP in a temperature range comprised between 25 and 70° C.

The caps illustrated in FIGS. 5 to 18 are molded products made of synthetic plastic material, which are each provided with a part (in particular the flap portion or the flange portion of the safety band) that can be folded according to the method of the present invention and/or with a part that can be cut to form the facilitated detachment zone of the tamperproof band. The products illustrated here are only some examples of products, in particular caps for containers, for which it is possible to use the present manufacturing method. It is in fact possible to manufacture other products by this manufacturing method. In general, the manufacturing method disclosed here can be applied to any type of product made of a material that has an alpha-type transition temperature $T\alpha$ that is greater than ambient temperature. In particular, the manufacturing method can be usefully applied for semi-crystalline polymers.

In the examples illustrated here the moulded products (in particular caps with an annular safety band showing the first opening of a container closed by the cap) each have an annular part (or flaps portion) that is folded after forming and is connected to the rest of the body of the product along a connecting zone or folding zone of annular shape. It is nevertheless possible to use the manufacturing method disclosed here also for folded elements that do not have an annular shape and/or which are not connected to the rest of the body of the moulded piece along a connecting or folding zone of annular shape.

It is in particular possible, in order to reduce both the yield in the folding zone and spring-back after folding, that the aforesaid folding temperature is greater than a limit temperature Tinf equal to $$Tinf = \frac{T\alpha + Tamb}{2}$$

in which $T\alpha$ is the alpha-type physical transition temperature of the plastic material, and Tamb is the ambient temperature (which can vary significantly, depending on the place of manufacture).

Particularly in order to reduce both the yield in the folding zone and spring-back after folding, the aforesaid folding temperature can be less than a limit temperature Tsup that is equal to Tsup=$T\alpha$+10° C., in which $T\alpha$ is the alpha-type physical transition temperature of the plastic material.

The aforesaid folding temperature could be comprised, for example in order to reduce both the yield in the folding zone and spring-back after folding, in an interval of values with an upper limit value Tsup=$T\alpha$+$\Delta$sup and a lower limit value Tinf=$T\alpha$−$\Delta$inf, in which $\Delta$sup is comprised between 0° C. and 20° C. and $\Delta$inf is comprised between 0° C. and 40° C. The folding temperature could be comprised, for example, between $T\alpha$−40° C. and $T\alpha$, or between $T\alpha$−40° C. and $T\alpha$+10° C., or between $T\alpha$−20° C. and $T\alpha$.

The aforesaid plastic material used in forming the product may comprise, as said, semi-crystalline plastic material, in particular one of the following materials or a mixture of materials containing at least one or more of the following materials: polyethylene, polypropylene, polyethyleneterephthalate.

It is possible to provide, after the molding step and before the folding step, a step of cooling in a controlled manner at least a part of the molded piece to be folded. This cooling step may include the operation of directing a flow of a cooling fluid (for example air) to the part of a molded piece to be cooled. The cooling fluid can have a temperature that is preset and controllable by a heat-conditioning device (of known type) that can be provided with a control unit that receives a desired value of the temperature of the cooling fluid and/or of the product to be cooled.

It is, for example, possible to provide during the aforesaid cooling for the moulded piece to be moved along a preset cooling path comprised between a moulding zone and a folding zone. This cooling path may comprise, for example, a transferring channel (closed or at least partially open), and/or a rotating tunnel, and/or a cooling silo, and/or a conveyor belt, or any other cooling system that is in particular suitable for operating continuously or discretely on a series or a considerable number of products.

It is possible to provide along the aforesaid path a measuring device being provided for measuring the temperature of the products (in particular of the zone intended for folding) and/or the temperature of a zone of the path. This measuring device is configured for emitting a signal that is received from a control unit that can, for example, control the cooling arrangement placed along the path and/or can control the travel time of the molded pieces along the path so as to vary the temperature, for example, with a feedback control as a function of a desired temperature.

Figure 5:
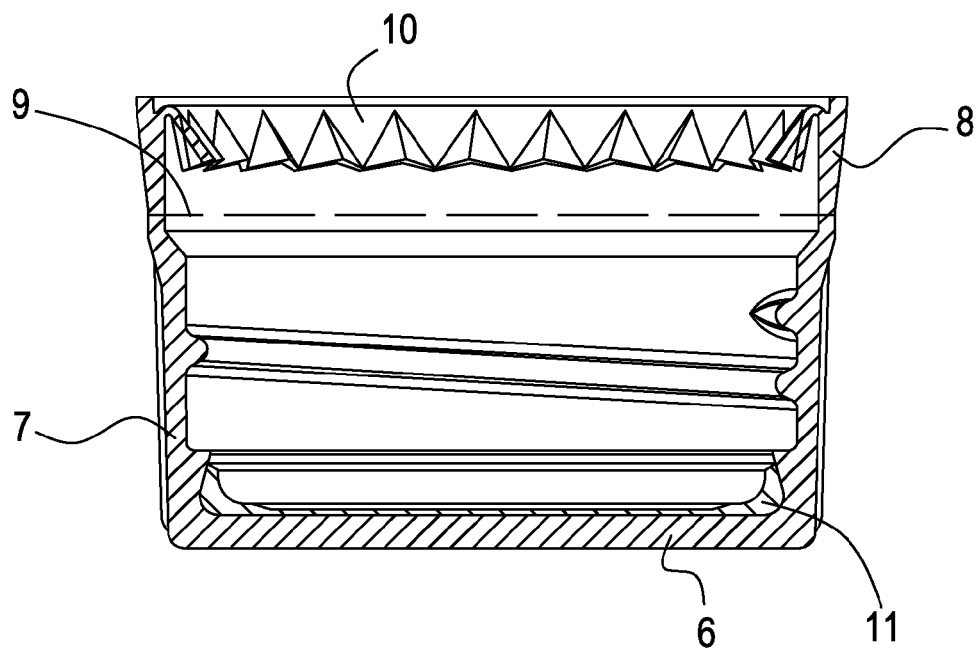
FIG. 5 is a section of a first embodiment of a cap made of plastics obtained after the flange folding step.
Figure 6:
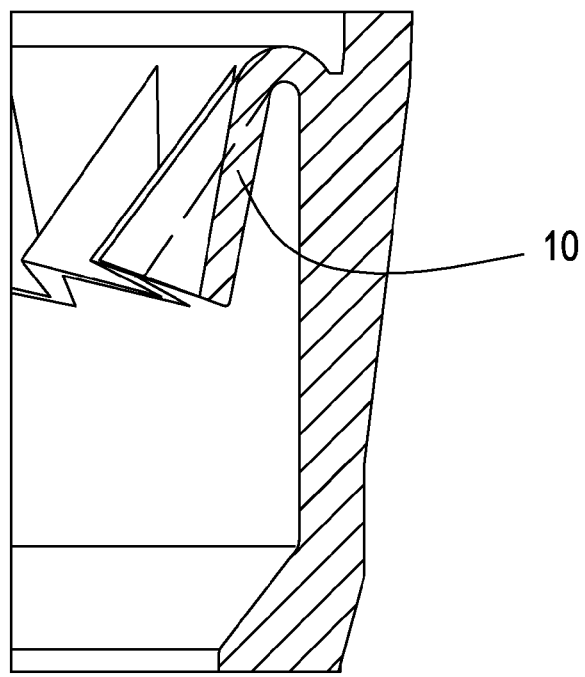
FIG. 6 is an enlarged detail of FIG. 5.
Figure 7:
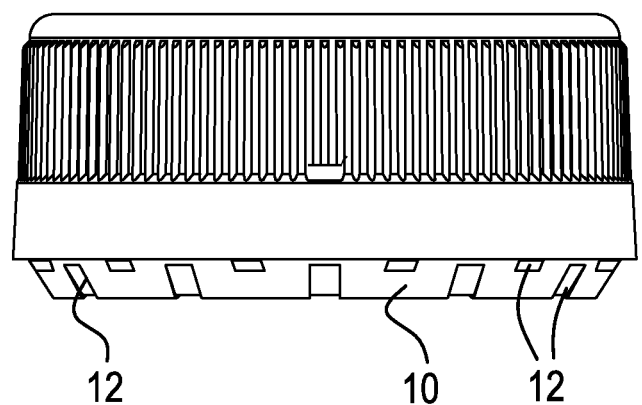
FIG. 7 is a side view of a second embodiment of a cap made of plastics obtained after moulding and before the flange folding step.
Figure 8:
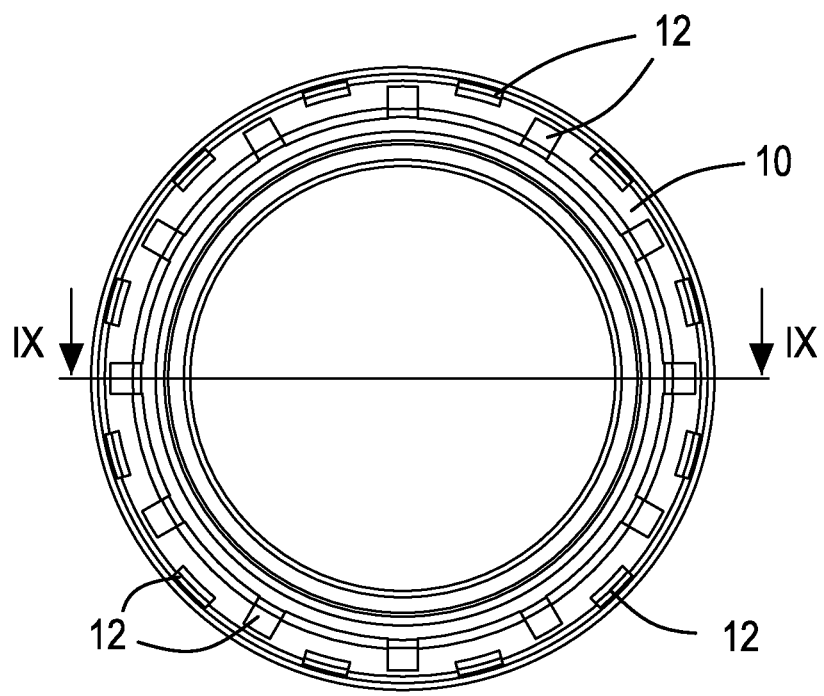
FIG. 8 is a section of the cap in FIG. 7 according to the line VIII-VIII of FIG. 9.
Figure 9:
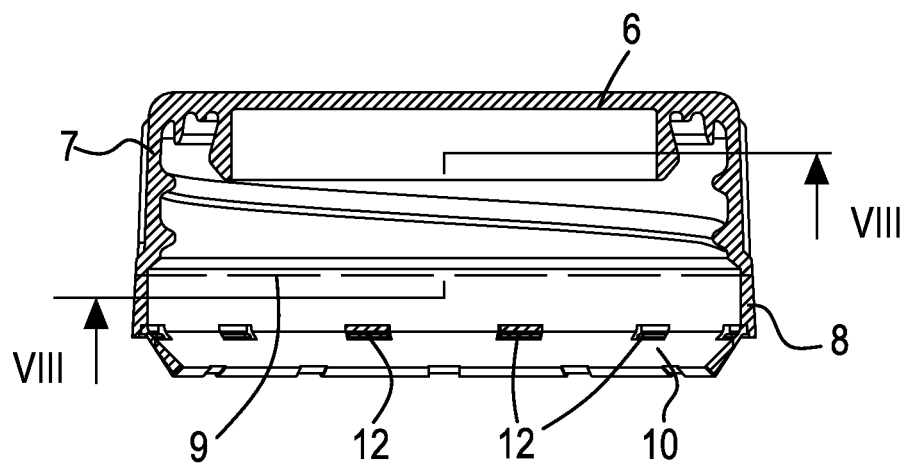
FIG. 9 is a section of the cap in FIG. 7 according to the line IX-IX of FIG. 8.
Figure 10:
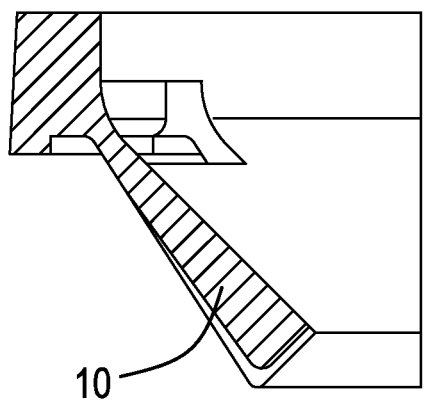
FIG. 10 is an enlarged detail of FIG. 9.

With reference to FIGS. 5 and 6, a cap made of plastics is illustrated that is made with the method in subject. The cap can be made of semi-crystalline plastic material. The cap has a closing portion 6 (upper portion, where "upper" refers to the position that the portion assumes in the usual closing configuration in which it closes the upper mouth of a container normally arranged standing in a vertical elevation) with a substantially flat or disk shape. The closing portion 6 can be substantially circular.

The cap further has a skirt portion or tubular portion 7 that emerges from the peripheral end of the upper portion 6. The skirt portion 7 can have internally (as in this case) a thread for coupling a corresponding thread borne by the neck of the container. It is possible to provide other types of cap provided with a system (of known type) of coupling with the container that is different from the screw coupling. To the end of the skirt portion 7 opposite the closing portion 6 an annular tamperproof band 8 is connected that is configured for detaching from the portion of skirt 7 when the container is first opened to indicate clearly that first opening has occurred. The annular tamperproof band 8 is connected to the skirt portion 7 by an annular facilitated breaking zone. This facilitated breaking zone can be obtained after moulding by means of the action of removing the material obtained with a cutting tool of known type. In the cap the breaking zone is obtained by cutting and is indicated by a dashed line 9.

The annular tamperproof band 8 is provided with an annular flap part 10 folded inwards and upwards (with reference to the use configuration of the cap coupled with the neck of the standing container). This annular flap part 10 is intended, when the container is first opened, to act as an axial abutment with an abutting element (for example a collar) protruding radially from the neck of the container for limiting or preventing axial movement of the safety band integrally with the rest of the cap when the latter is raised to enable the container to be opened.

In the specific case the annular flap part 10 is formed by a body extending in a circumferential direction around the edge of the safety band 8. This annular flap part 10 has a series of radial protrusions or corrugated elements. In the specific case this annular flap part 10 comprises a plurality of triangular elements connected in series one after the other along a respective side. This folded annular flap part 10 may comprise an upper edge, that faces upwards (with reference to the use configuration of the cap that closes the upper neck of the standing container), i.e. that faces the upper closing part the upper closing part 6 of the main body of the cap, in which this upper edge has an undulating or zigzag shape, forming overall a plurality of radial protrusions protruding inwards and arranged alongside one another in a circumferential direction.

In the specific case the cap has a seal 11, for example disc-shaped, arranged below the upper closing portion 6 and intended in use to act as a fluid seal, in the known manner, on the upper end of the neck of the container.

The annular flap part 10 is subjected to a folding operation in the use configuration, like the one illustrated in FIGS. 1A to 1E, after the cap has been moulded (moulding being injection moulding, compression moulding, or other known hot-forming systems for plastic material).

The folding operation may consist, as said, of modifying the orientation of the flap part 10 in a mechanically guided manner. Typically, this orientation is modified such that the flap part 10 is moved from a configuration in which it faces downwards (still with reference to the use configuration of the cap), i.e. facing an opposite side to the upper closing portion 6 of the cap, to a configuration in which it faces upwards, i.e. faces the aforesaid upper closing portion 6. The folding operation occurs by using a folding tool that is substantially of known type, i.e. any of the folding tools of known type for folding in use position an annular flap part of a safety band of a moulded cap made of plastics. As said, the folding operation occurs when the temperature of the moulded piece, in particular the temperature of the flap part that has to be folded, is not only less than the forming temperature or the outlet temperature of the moulded piece from the forming cavity, but more in particular at a still lower temperature, i.e. a temperature that is less than the alpha transition temperature of the plastic material with which the cap is made.

In particular, if the temperature Tα of the material is approximately 80° C., the folding temperature is approximately 40-80° C., or approximately 70-80° C.; if the temperature Tα is approximately 70° C., the folding temperature is approximately 40-70° C., or approximately 60-70° C.; if the temperature Tα is approximately 100° C., the folding temperature will be approximately 60-100° C., or approximately 90-100° C. In practice, it is possible to use a temperature range between Tinf=Tα−30/40° C. and Tsup=Tα+0/10° C.

The operation of forming the facilitated detachment zone of the safety band occurs subsequently, in practice immediately after (or previously, in fact immediately before) so that the temperature at which this subsequent operation is conducted is substantially the same as or slightly below or slightly above (for example with a difference of not more than 5-15° C. below or above) the temperature at which folding is performed. As said, forming the facilitated detachment zone may comprise removing material, in particular removing performed by a cutting tool. Therefore also the cutting operation (which in general comprises a continuous cut or a series of cuts performed along an external or internal circumferential zone of the cap) may occur with advantage at a temperature that is approximately the same as or less than the alpha transition temperature of the material of the cap. The cutting devices used for forming the facilitated detachment zones are of known type and do not therefore require particular explanations.

With reference to FIGS. 7 to 10, a second type of cap is illustrated. The elements that are analogous to those of FIGS. 5 and 6 have been indicated for the sake of greater clarity by the same numbering. As in the previous case, the cap is manufactured as a folding of the annular flap part 10 at a temperature that is selected on the basis of the type of material and, in particular, of the alpha transition temperature of the material. Also in this case the folding operation can occur at a temperature that is approximately the same as the alpha transition temperature or the same as the temperatures disclosed above. In the specific case the annular flap part 10 comprises a strip of material that is at a substantially continuous height and is provided with a plurality of through notches or holes 12 that are arranged spaced apart from one another in a circumferential direction along the folding zone.

Figure 11:
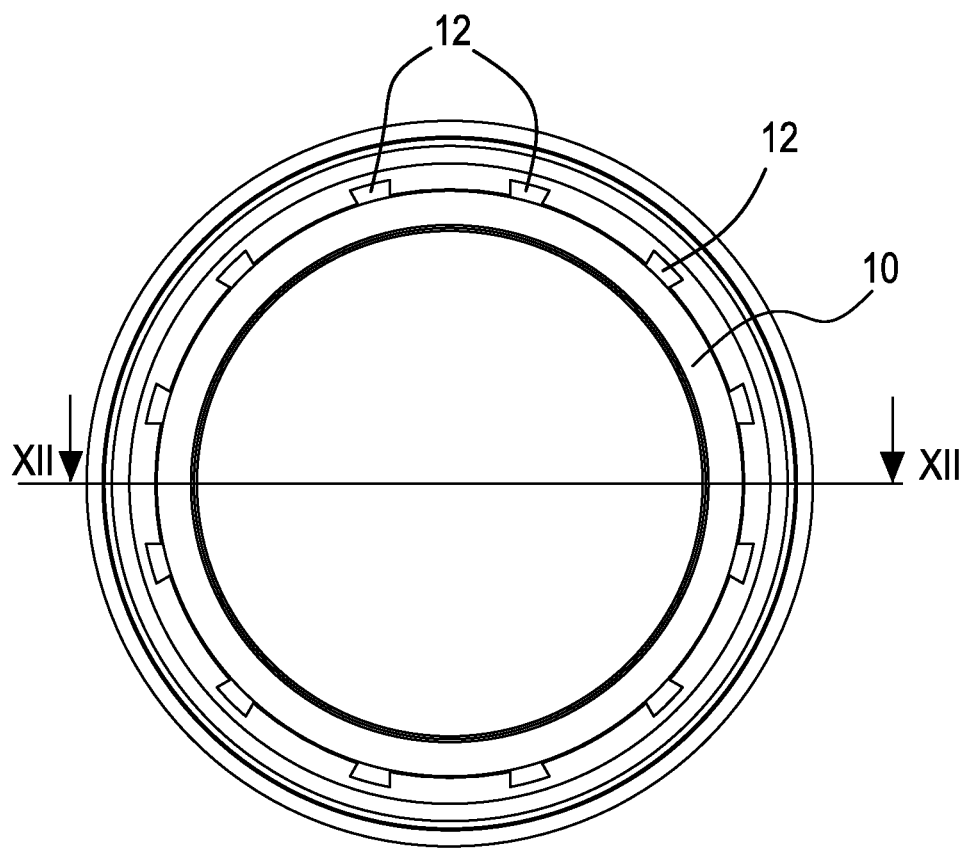
FIG. 11 is a section according to the line XI-XI of FIG. 12 of a third embodiment of a cap made of plastics obtained after the flange folding step.

In FIGS. 11 to 13 there is illustrated another example of a cap provided with an annular flap part with features that are again different from those of the previous embodiments. The elements that are analogous to those of FIGS. 5 to 10 have been indicated by the same numbering. In particular, this annular flap part 10 (which is shown here in the use configuration, thus after folding at the preset temperature) comprises a series of steps that are defined by flap parts at a different height that alternate one after another in a circumferential direction. In the specific case certain flap parts further comprise a series of end portions 13 folded inwards to give rise to a series of abutting elements that overall define an abutting element (extending substantially along a loop) intended for the axial abutment with the collar of the neck of the container. Each of these end portions emerges from an end edge of the flap parts with a greater height. The annular detachment zone will be conducted in a known manner (for example through the removal of material), at the preset temperature less the temperature Tα, for example immediately after or immediately before the folding operation. The folding and material removal temperatures are anyway selected, even for this cap, according to the same criteria as those disclosed above.

Figure 14:
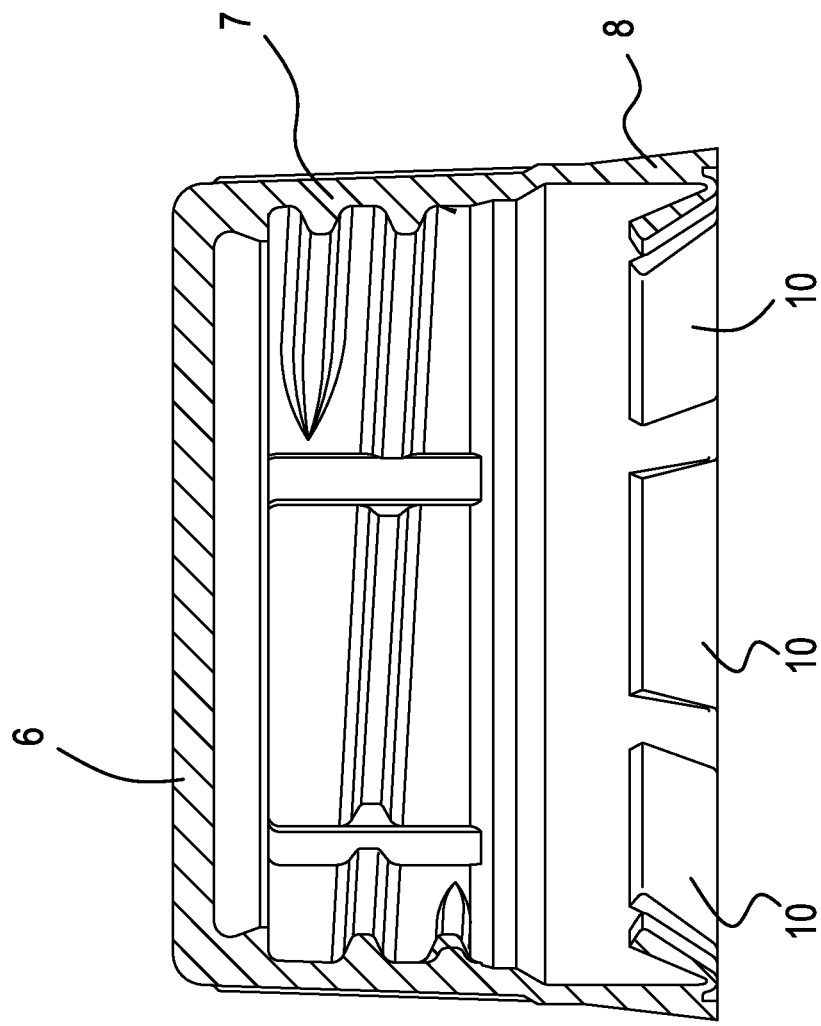
FIG. 14 is a section of a fourth embodiment of a cap made of plastics obtained after the flange folding step.

In FIG. 14 a further embodiment of a cap is illustrated that is makable with one of the manufacturing methods disclosed above. In this embodiment the flap part 10 comprises a plurality of flap portions (for example rectangular or trapezoidal) arranged one alongside the other along an end edge of the safety band 8. Such flap portions are spaced apart from one another in a circumferential direction. These flap portions form a plurality of (folded) flap abutting elements that are independent of one another. The folding and material removal temperatures are selected in the manner disclosed above.

It is thus provided that a cap is manufactured with a folding of the annular flap part 10 at a temperature selected on the base of the type of material and in particular on the base of the alpha transition temperature of the material, and in which the operation of forming the facilitated detachment zone (which operation may comprise removal of material by cutting tool) is conducted before (or after) the folding operation of the annular flap part. The two operations (removal of material and folding) can occur in rapid succession (by means of devices of known type), for which reason in practice the execution temperature for both operations is less or almost the same as the alpha transition temperature of the material and greater than ambient temperature.

It is further possible that no folding operation is provided in a cap but a forming operation of the facilitated detachment zone is provided (an operation that may comprise as said a removal of material by means of a cutting tool) and that this operation is performed at a temperature selected as disclosed above, i.e. on the basis of the type of material and, in particular, of the alpha transition temperature of the material, for which reason in practice the execution temperature can be approximately the same or less than the alpha transition temperature of the material.

Figure 15:
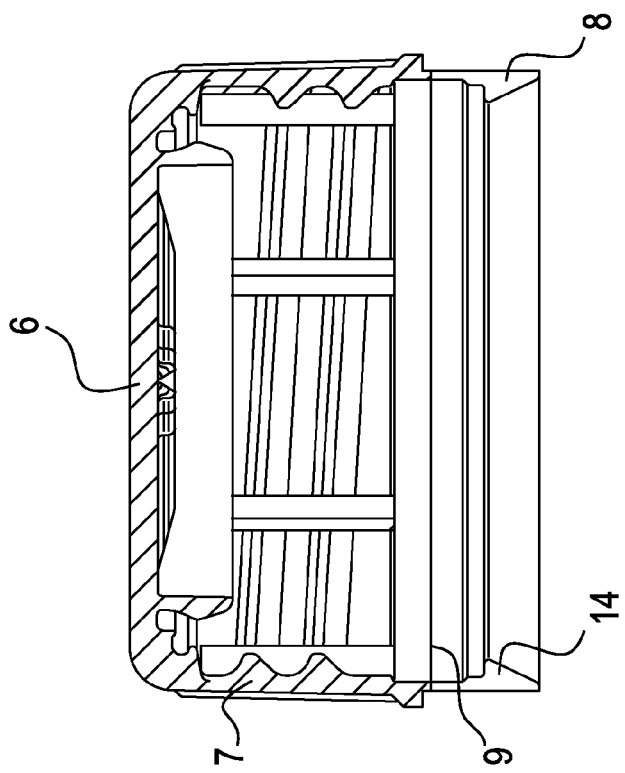
FIG. 15 shows a section of a cap made of synthetic plastics provided with a tamperproof band that is detachable along a facilitated breaking zone and further provided with a stiff contrasting arrangement.

In FIG. 15 there is shown a cap made of synthetic plastics provided with a tamperproof band 8 that is detachable at the time of the first opening of the container in which the facilitated detachment zone was obtained by a material removing operation, in particular by cutting, conducted at a temperature selected as disclosed above. In this specific case the contrasting element 14, which cooperates in a known manner with a corresponding contrasting arrangement on the neck of the container, does not, as in the previous embodiments, have flap parts that have to be folded after extracting from the forming cavity.

Figure 16:
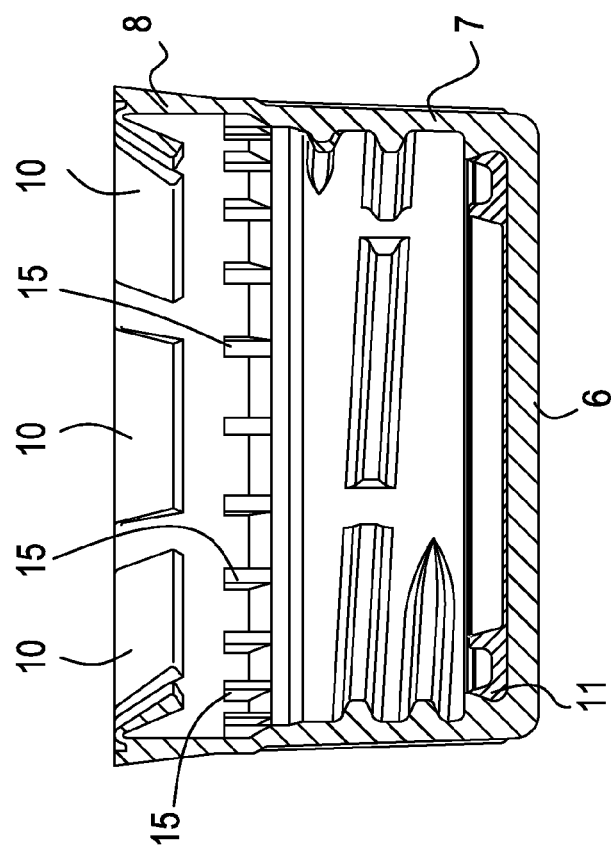
FIG. 16 shows a section of a cap made of plastics in which the facilitated detachment zone comprises a continuous cutting line that extends along a zone provided with protrusions that form connecting bridges between the tamperproof band and the rest of the cap.
Figure 17:
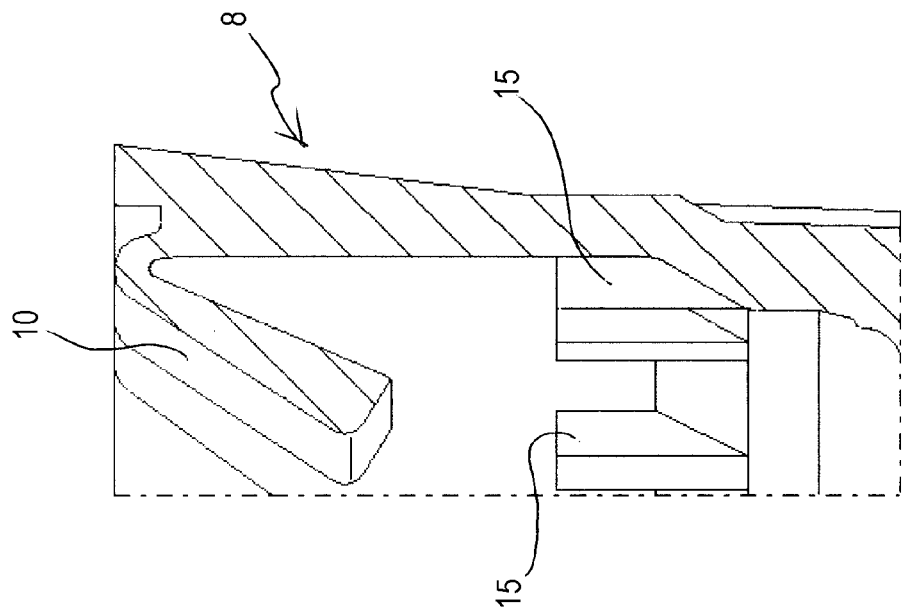
FIG. 17 is an enlarged detail of FIG. 16.

In the cap in FIGS. 16 and 17 the flap portion 10 has been folded simultaneously, or immediately before, or immediately after, with respect to forming by cutting the facilitated detachment zone. In this case this detachment zone comprises a continuous cutting line that plunges into the material of the skirt portion of the cap without completely plunging into several protrusions 15 (that emerge inwards the cap) that are angularly spaced apart from one another so as to form connecting zones (bridges intended for being fractured) between the tamperproof band 8 and the rest of the cap.

Figure 18:
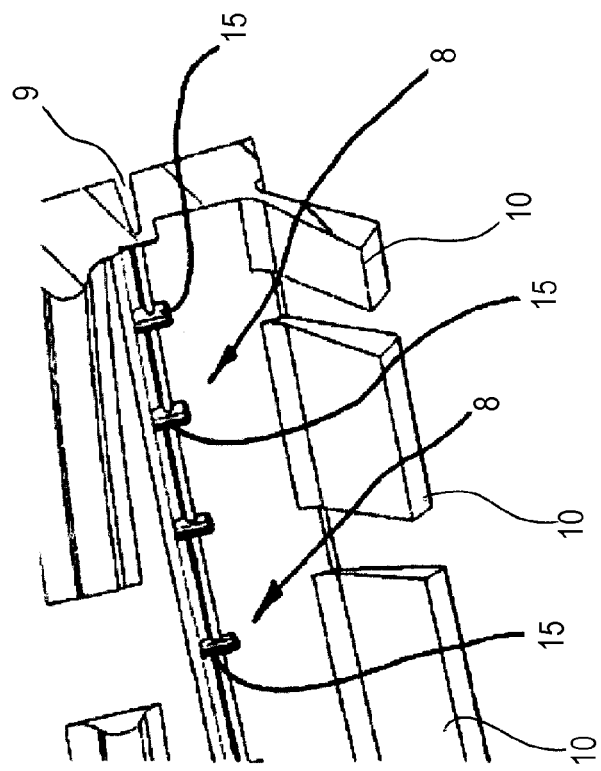
FIG. 18 shows a detail of a cap made of plastics provided with a tamperproof band bounded by a continuous cutting line.

In FIG. 18 there is shown the continuous cutting line that forms the facilitated detachment zone 9 in presence of the series of radial protrusions 15 (facing inwards the cap) arranged spaced apart from one another in a circumferential direction, the thickness of which is not fully affected by the cut.

Figure 19A:
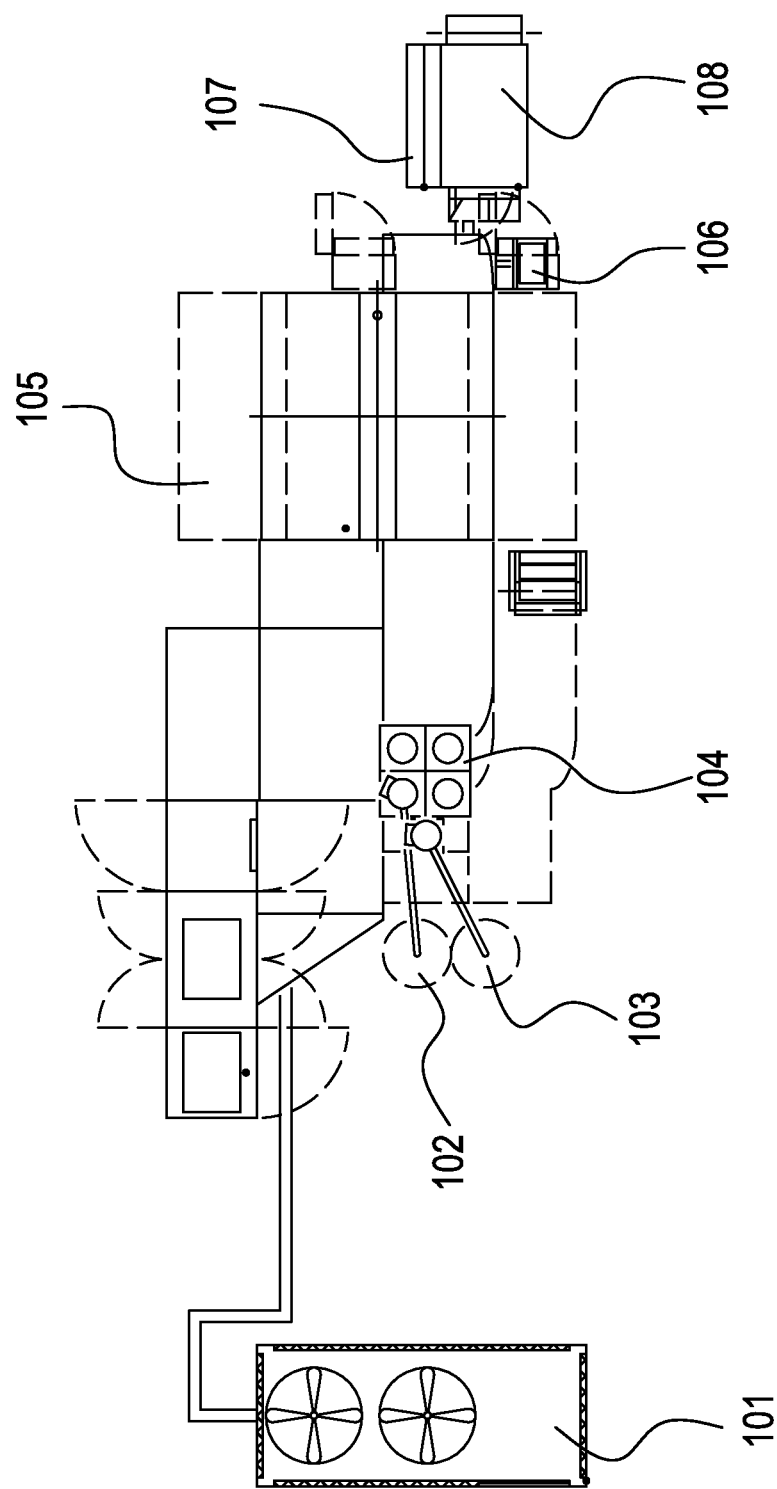
FIGS. 19A and 19B are two parts of a top plan view of a first embodiment of a plant for manufacturing caps made of plastics having a safety band provided with a flexible flange to be folded inwards.
Figure 19B:
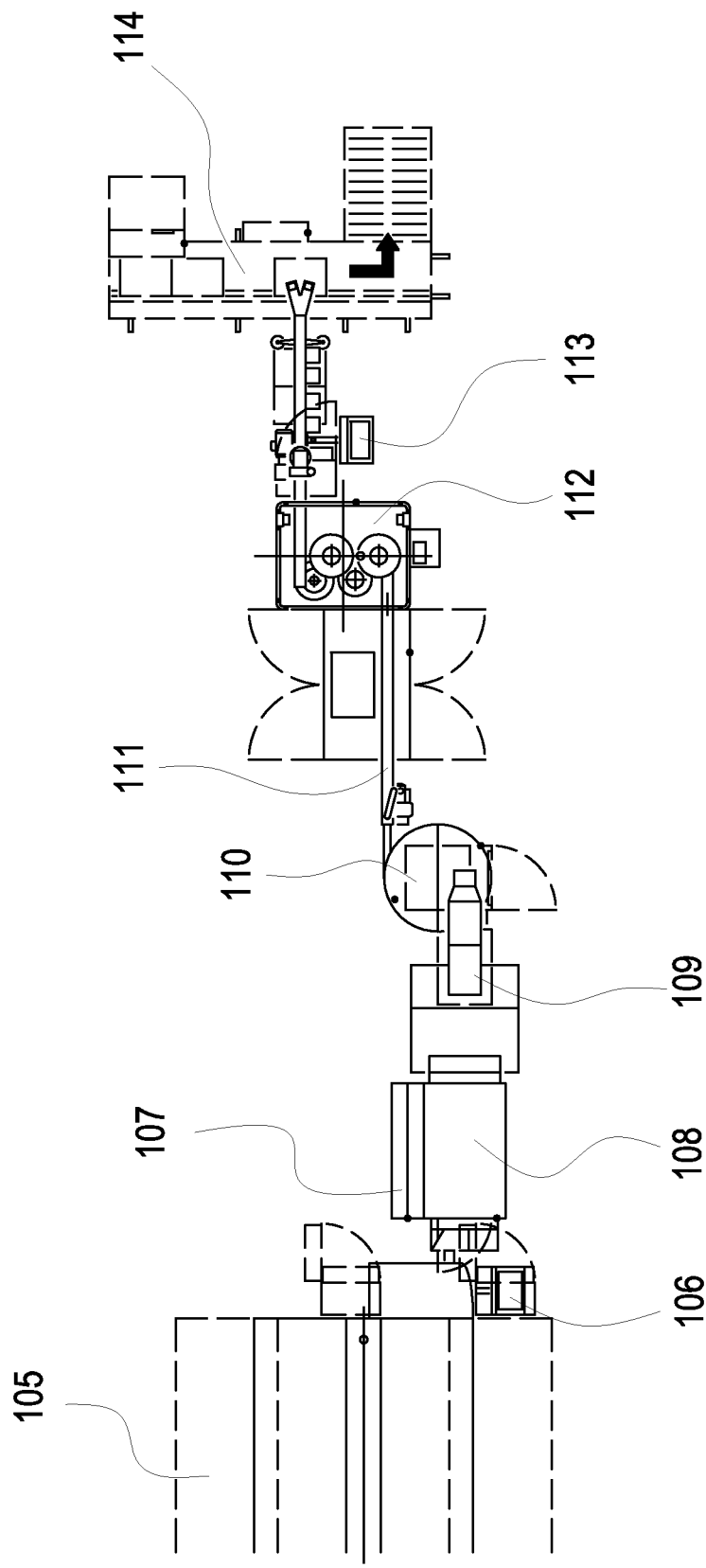

With reference to FIGS. 19A and 19B, which illustrate a first embodiment of the layout of a plant for implementing a method for manufacturing moulded products in which folding and material removal are conducted, with 101 has been indicated a cooler, with 102 and 103 two suppliers of plastic material in flowable solid form to be processed, with 104 a mixer of the material, with 105 a compression-moulding apparatus for forming in particular caps, with 106 a system for optical control of moulded caps, with 107 a heat exchanger, with 108 a cooling device for cooling moulded caps, with 109 an elevator (for example of the cup type) for the caps, with 110 a cap orienting device, with 111 a conveyor for advancing caps (for example of the air-jet type), with 112 a cutting and folding device (for forming the facilitated breaking zone and for folding the flange of the tamperproof band of the caps), with 113 another system for optical control of the caps, with 114 a device for introducing the caps into packaging containers. It should be noted that in the plant in FIG. 15 the cooling of the caps before the zone of folding and cutting is actuated by means of specific cooling actuators that are configured for taking the caps in the folding and cutting zone to the preset temperature that is approximately the same or less than the transition temperature Tα. The cutting and folding device 112, which is of known type, comprises two vertical-axis continuously operating carousels, each provided with a plurality of identical working apparatuses that operate in a cyclical manner by performing a work cycle at each revolution of the carousel, in which the two carousels are part of a work path along which a series of workpieces proceed continuously that are arranged in a line, one following the other.

Figure 20B:
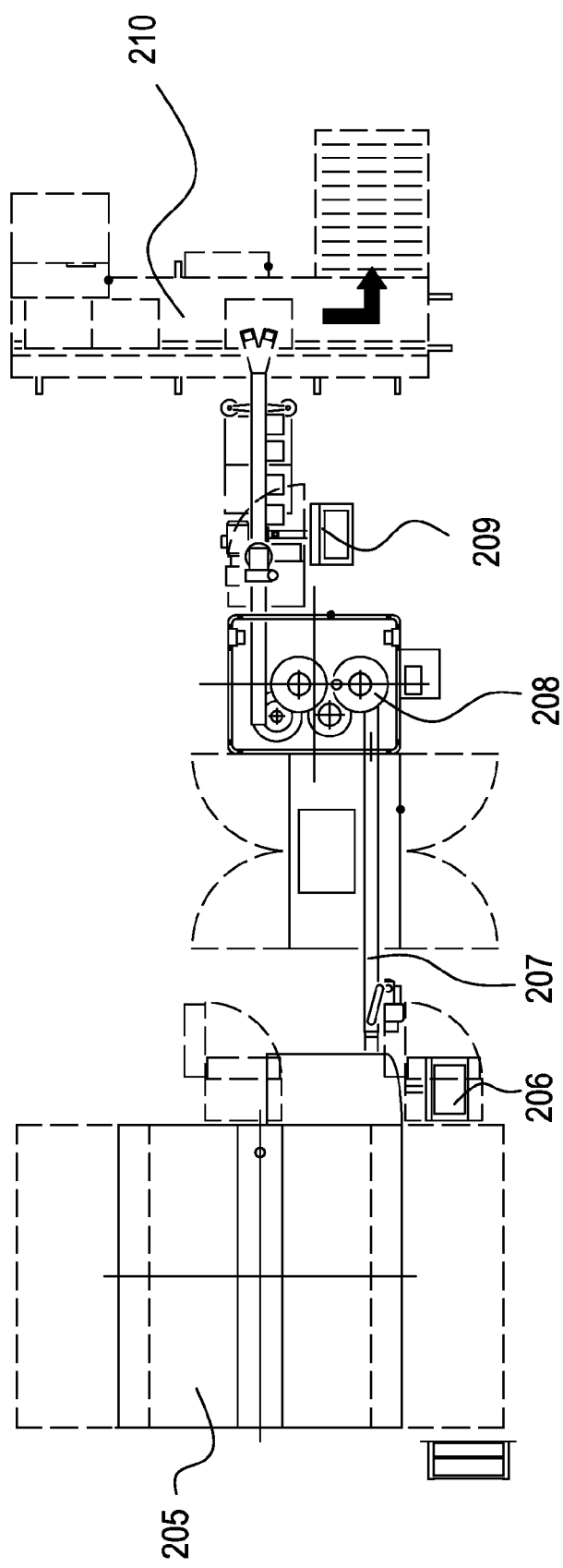

With reference to FIGS. 20A and 20B, which illustrate a second embodiment of the layout of a plant for implementing a method for manufacturing moulded products, with 201 has been indicated a cooler, with 202 and 203 two suppliers of plastic material in flowable solid form to be processed, with 204 a mixer of the material, with 205 a compression moulding apparatus for forming in particular caps, with 206 a system for optical control of moulded caps, with 207 a conveyor for advancing caps (for example of the air-jet type), with 208 a cutting and folding device (for forming the facilitated breaking zone and for folding the flange of the tamperproof band of the caps), with 209 another system of optical control of the caps, with 210 a device for introducing caps into packaging containers. It should be noted that in the plant in FIG. 16 cooling of the caps before the folding and cutting zone is implemented by suitable adjustment of the time the caps remain between the moulding zone and the cutting-folding zone so that the cutting-folding temperature is the desired temperature, i.e. approximately the same as or less than the transition temperature Tα. The caps could be cooled by adjusting the temperature of the air (or of another conveying fluid) used for advancing the caps (with a fluid conveying system of known type); if the advancement of the caps occurs in another manner (for example by a conveyor belt), the temperature can be controlled by using air or another fluid introduced into conveying channels.

The cutting and folding device 208 is of the type disclosed above. Amongst the cutting devices that are usable for forming the facilitated detachment zone are included all known devices used for this purpose such as, for example, the devices disclosed in the following patent publications EP 0619168, WO 99/17911, WO 00/44538, WO 2004/004993, which are deemed to be incorporated by reference.

In FIG. 21 there is schematically illustrated the layout of a continuous-cycle folding device that is usable for folding, according to the various methods disclosed above, the flap portion of a tamperproof band for caps. FIG. 21 shows the path (in continuous advancement in the direction indicated by the arrows) of the caps 16 that comprises an inlet system that introduces the caps one after another into a rotating carousel 17 with a vertical axis that is provided with a series of folding tools (which are not illustrated) that operate continuously (in a known manner) along the circular path of the caps so that at least one folding tool is associated with each cap, and an outlet system that removes the caps after folding and guides the caps, one after another, to the subsequent operating zones.

In FIG. 22 there is illustrated schematically the layout of a cutting device that is usable for forming the facilitated detachment zone, according to the various methods disclosed above, of a tamperproof band for caps. The cutting device (of known type) comprises an inlet path for continuous advancement of the caps 16 one after the other, a cutting carousel 18 that removes the caps one by one and moves the caps to a cutting tool 19 (arranged in this case inside the circular path of the caps 16) with a motion that enables (in a known manner) the facilitated detachment zone to be formed. FIG. 23 shows in section a detail of a cutting device (of known type) comprising a movement carousel 20 of the caps that leads the caps 16 to the cutting tool 21 (which in the particular case operates outside the circular path of the caps). The cutting device illustrated here is configured in particular for forming a continuous cut along an entire circumference of the cap (which is rotated on itself) and may in particular be suitable for caps provided with protrusions prearranged along the detachment zone, like the protrusions 15 in FIGS. 16 and 18. The structure and operation of the cutting device in FIG. 23 are substantially known.

The invention claimed is:

1. A method comprising the steps of:
   molding a piece made of synthetic plastic material comprising at least a semi-crystalline plastic material, said molded piece having at least a first portion and a second portion connected to said first portion along a connecting zone;
   mechanically folding in a guided manner said second portion around said connecting zone at a folding temperature that is greater than ambient temperature;
      selecting said folding temperature according to at least an intermediate physical transition temperature of said synthetic plastic material, wherein:
   said folding temperature is greater than a limit temperature Tinf that is equal to one of $$Tinf = \frac{T\alpha + Tamb}{2},$$

and
   Tinf=Tα−40° C.; and
   said folding temperature is less than a limit temperature Tsup equal to Tsup=Tα+10° C.;
      Tα being the alpha-type physical transition temperature of said synthetic plastic material, and Tamb being the ambient temperature, for semi-crystalline polymers the transition α representing the crystalline phase.

2. A method according to claim 1, wherein said folding temperature is less than the alpha-type physical transition temperature of said plastic material.

3. A method according to claim 1, wherein said semi-crystalline plastic material comprises at least a material selected from the following group of materials: polyethylene, high density polyethylene, polypropylene, and polyethyleneterephthalate.

4. A method according to claim 1, wherein said first:portion comprises a skirt portion and said second portion comprises an edge portion.

5. A method according to claim 1, wherein said folding temperature is greater than the beta-type physical transition temperature of said synthetic plastic material.

6. A method according to claim 1, comprising a step of cooling at least a part of said molded piece, said at least a part of said molded piece comprising said first part and/or said second part and/or said connecting zone, said cooling step being performed before said folding step and further being performed in a controlled manner in order to bring said at least a part of said molded piece to the desired folding temperature.

7. A method according to claim 6, wherein said cooling step comprises directing a flow of a cooling fluid to said at least a part of the molded piece to be cooled.

8. A method according to claim 6, wherein said cooling step comprises moving said molded piece along a preset cooling path between a molding zone and a folding zone.

9. A method according to claim 1, wherein said connecting zone has an annular shape.

10. A method according to claim 1, and further comprising a step of removing material from said molded piece at a material removal temperature selected according to said at least an intermediate physical transition temperature of said synthetic plastic material, said material removal temperature being comprised in a range equal to said folding temperature plus/minus 15° C.

11. A method according to claim 1, and further comprising the steps of:
   molding a piece made of synthetic plastic material, said molded piece having at least a skirt portion;
   forming on said skirt portion a facilitated detachment zone that separates an edge portion from the rest of the skirt portion, said forming step comprising a material removal step;
   said material removal step being performed with the synthetic plastic material of said skirt portion at a removal temperature that is greater than ambient temperature and less than an upper limit value Tsup=Tα+10° C., Ta being the alpha-type intermediate physical transition temperature of said plastic material.

12. A method according to claim 11, wherein said removal temperature is greater than Tinf=Tα−40° C.

13. A method according to claim 11, wherein said material removal temperature is less than Tα.

14. A method according to claim 11, comprising the further steps of mechanically folding in a guided manner a part of an edge portion protruding as a flap around a folding zone at said folding temperature, and selecting said folding temperature as a function of said intermediate physical transition temperature Tα.

15. A method according to claim 11, wherein said material removal step comprises a cutting operation along a circumferential extension region of said skirt portion.

* * * * *